US012630735B2

(12) United States Patent
Gerli

(10) Patent No.: US 12,630,735 B2
(45) Date of Patent: May 19, 2026

(54) HYDROPHILIC CATIONIC DISPERSION POLYMERS FOR IMPROVED PRINT QUALITY AND WATER FASTNESS

(71) Applicant: ECOLAB USA INC., St. Paul, MN (US)

(72) Inventor: Alessandra Gerli, Leiden (NL)

(73) Assignee: ECOLAB USA INC., St. Paul. (MN)

( * ) Notice: Subject to any disclaimer, the term of this patent is extended or adjusted under 35 U.S.C. 154(b) by 1055 days.

(21) Appl. No.: 17/614,720

(22) PCT Filed: Jun. 4, 2020

(86) PCT No.: PCT/US2020/036129
§ 371 (c)(1),
(2) Date: Nov. 29, 2021

(87) PCT Pub. No.: WO2020/247637
PCT Pub. Date: Dec. 10, 2020

(65) Prior Publication Data
US 2022/0228019 A1 Jul. 21, 2022

Related U.S. Application Data

(60) Provisional application No. 62/858,831, filed on Jun. 7, 2019.

(51) Int. Cl.
*C09D 133/26* (2006.01)
*C09D 7/65* (2018.01)
(Continued)

(52) U.S. Cl.
CPC ............. *C09D 133/26* (2013.01); *C09D 7/65* (2018.01); *C09D 11/107* (2013.01); *D21H 19/56* (2013.01)

(58) Field of Classification Search
CPC .................................................... C09D 133/26
See application file for complete search history.

(56) References Cited

U.S. PATENT DOCUMENTS 6,511,736 B1 * 1/2003 Asano .................... B41M 5/506 428/206
6,592,718 B1 * 7/2003 Wong Shing ........ D21H 23/765 162/158
(Continued)

FOREIGN PATENT DOCUMENTS

| | | | |
|---|---|---|---|
| EP | 1048479 | A2 | 11/2000 |
| WO | 0249839 | A1 | 7/2002 |

OTHER PUBLICATIONS

International Search Report and Written Opinion for International Application No. PCT/US2020/036129, mailed on Nov. 9, 2020.

*Primary Examiner* — Michael F Pepitone
(74) *Attorney, Agent, or Firm* — Edmonds & Cmaidelka, P.C.

(57) ABSTRACT

Hydrophilic cationic dispersion polymers, compositions including same, and methods of using same. In some examples, a composition can include a hydrophilic cationic dispersion polymer disposed on a surface of a substrate. The substrate can be a paper, a textile, a non-woven material, a film, or mixtures thereof. The hydrophilic cationic dispersion polymer can include repeating units derived from a first monomer and a second monomer. The first monomer can be a nonionic monomer and the second monomer can be at least one hydrophilic cationic monomer selected from a diallyl-N,N-dimethylammonium halide and a monomer of the formula I: where $A_1$ can be O or NH; $B_1$ can be a $C_2$-$C_4$ alkylene or hydroxypropylene; $R_1$ can be H or $CH_3$; $R_2$ and $R_4$ can independently be a $C_1$-$C_2$ alkyl; $R_3$ can be H or a $C_1$-$C_2$ alkyl; and $X_1$ can be an anionic counterion.
(Continued)

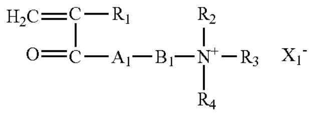

(I)

20 Claims, 3 Drawing Sheets

(51) Int. Cl.
*C09D 11/107* (2014.01)
*D21H 19/56* (2006.01)

(56) References Cited

U.S. PATENT DOCUMENTS

2003/0180481 A1* 9/2003 Miknevich, Jr. ......... B41M 5/52
428/32.1
2014/0054232 A1* 2/2014 Duttlinger, Jr. ........... C02F 1/54
210/199
2016/0311693 A1* 10/2016 Bai ....................... C09C 1/3045

* cited by examiner

HYDROPHILIC CATIONIC DISPERSION POLYMERS FOR IMPROVED PRINT QUALITY AND WATER FASTNESS

CROSS REFERENCE TO RELATED APPLICATIONS APPLICATION

This is a National Stage application under 35 U.S.C. § 371 of PCT/US2020/036129, filed on Jun. 4, 2020, and published as WO 2020/247637, which claims priority to U.S. Provisional Patent Application No. 62/858,831, filed on Jun. 7, 2019, which are both incorporated by reference herein.

FIELD

Embodiments disclosed herein generally relate to substrates that include a hydrophilic cationic dispersion polymer disposed on a surface thereof.

BACKGROUND

The challenge of achieving good ink jet print quality is mainly related to an ability of the substrate to effectively receive ink. The colorant component of such ink, e.g., a dye or a pigment, needs to be fixed at the surface of the substrate to achieve good optical density of the printed image with no bleeding and feathering. Good print quality, however, is not easily achievable when a standard coated offset paper or a multi-purpose paper is the substrate.

Typically, the fixation of the colorant at the surface with concomitant absorption of the water phase of the ink into the substrate is achieved by treating the surface of the substrate with costly specialty coating formulations. These specialty coating formulations generally contain silica and/or other insoluble pigments, special binders, and/or additives, e.g., as described by A. Swerin et al. in the Proceedings of the 2008 TAPPI 10$^{th}$ Advanced Coating Fundamentals Symposium.

Solution polymers such as poly-diallyl-N,N-dimethylammonium chloride and polyamines have been used in coating formulations to promote fixation of an anionic ink and improve water fastness of the prints. Although solution polymers can act as ink fixatives, such solution polymers are poor film formers and thus tend to absorb into the substrate rather than adhere to its surface. As a result, while solution polymers may improve water fastness and decrease the level of print bleeding, such solution polymers generally lead to limited improvement of print optical density. Thus, the use of solution polymers requires the addition of costly specialty coating additives to attain well balanced print quality results.

Latex polymers are produced by an emulsion polymerization process that is suitable for preparing higher molecular weight polymers. Higher molecular weight cationic latex polymers have improved film forming capability compared to solution polymers. Unfortunately, latex polymers cause a drastic increase in the viscosity of the coating formulation precluding the use of such latex polymers not only in specialty coating formulations, but also in standard size press formulations, for example those containing starch as a main component.

As it is difficult to increase the film forming capabilities for improved print density while simultaneously reducing print bleeding and water fastness, there is a need for substrates with improved ink jet printing performance and methods for the production thereof, especially for substrates that can be attained without or with a reduced use of the specialty coating formulations.

SUMMARY

Hydrophilic cationic dispersion polymers, compositions including same, and methods of using same are provided. In some examples, a composition can include a hydrophilic cationic dispersion polymer disposed on a surface of a substrate. The substrate can be a paper, a textile, a nonwoven material, a film, or a mixture thereof. The hydrophilic cationic dispersion polymer can include repeating units derived from a first monomer and a second monomer. The first monomer can be a nonionic monomer and the second monomer can be at least one hydrophilic cationic monomer selected from the group consisting of a diallyl-N,N-dimethylammonium halide and a third monomer of the formula I:

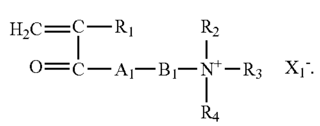

I

In some examples, $A_1$ can be O or NH; $B_1$ can be a $C_2$-$C_4$ alkylene or hydroxypropylene; $R_1$ can be H or $CH_3$; $R_2$ and $R_4$ can independently be a $C_1$-$C_2$ alkyl; $R_3$ can be s H or a $C_1$-$C_2$ alkyl; and $X_1$ can be an anionic counterion.

In some examples, a method of treating a substrate surface can include applying an aqueous solution that can include a hydrophilic cationic dispersion polymer to the surface of a paper substrate. The hydrophilic cationic dispersion polymer can include repeating units derived from a first monomer and a second monomer. The first monomer can include a nonionic monomer and the second monomer can be at least one hydrophilic cationic monomer selected from the group consisting of a diallyl-N,N-dimethylammonium halide and a third monomer of the formula I:

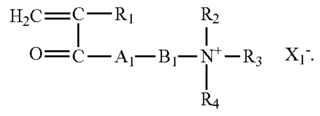

I

In some examples, $A_1$ can be O or NH; $B_1$ can be a $C_2$-$C_4$ alkylene or hydroxypropylene; $R_1$ can be H or $CH_3$; $R_2$ and $R_4$ can independently be a $C_1$-$C_2$ alkyl; $R_3$ can be H or a $C_1$-$C_2$ alkyl; and $X_1$ can be an anionic counterion.

In some examples, a paper composition can include a paper substrate; a starch; a sizing agent; and 0.02 weight % to 0.7 weight % of a hydrophilic cationic dispersion polymer based on a dry weight of the paper substrate. In other examples, a paper composition can include a paper substrate; a starch; a sizing agent; and 0.02 weight % to 0.7 weight % of a hydrophilic cationic dispersion polymer based on the dry weight of the paper substrate. The hydrophilic cationic dispersion polymer can include repeating units derived from a first monomer and a second monomer. The first monomer can be acrylamide or methacrylamide, and the second monomer can be at least one hydrophilic cationic monomer selected from the group consisting of a diallyl-N,N-dimethylammonium halide and a third monomer of the formula I:

I

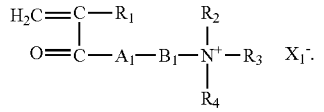

In some examples, $A_1$ can be O or NH; $B_1$ can be a $C_2$-$C_4$ alkylene or hydroxypropylene; $R_1$ can be H or $CH_3$; $R_2$ and $R_4$ can be independently a $C_1$-$C_2$ alkyl; $R_3$ can be H or a $C_1$-$C_2$ alkyl; and $X_1$ is an anionic counterion selected from the group consisting of: a halide ion, a sulfate ion, a phosphate ion, a monohydrogen phosphate ion, and a nitrate ion.

In some examples, the hydrophilic cationic monomer can be dimethylaminoethylacrylate methyl chloride salt (DMAEA.MCQ), dimethylaminoethylmethacrylate methyl chloride salt (DMAEM.MCQ), dimethylaminoethylmethacrylate methyl sulfate salt (DMAEM.MSQ), dimethylaminoethylacrylate methyl sulfate salt (DMAEA.MSQ), methacrylamidopropyl trimethylammonium chloride (MAPTAC), or acrylamidopropyl trimethylammonium chloride (APTAC). In some examples, the hydrophilic cationic monomer can be DMAEA.MCQ. In some examples the hydrophilic cationic monomer can be diallyl-N,N-dimethylammonium chloride (DADMAC).

In some examples, a hydrophilic cationic dispersion polymer can be deposited or otherwise disposed onto a surface of a substrate. The hydrophilic cationic dispersion polymer as defined herein can be or include (a) a nonionic monomer; (b) a hydrophilic cationic monomer; (c) and optionally a hydrophobic cationic monomer.

In some examples, the hydrophobic cationic monomer can be at least one monomer of the formula II:

II

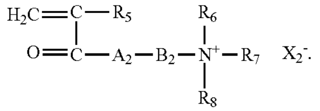

In some examples, $A_2$ can be O or NH; $B_2$ can be a $C_2$-$C_4$ alkylene or hydroxypropylene; $R_5$ can be H or $CH_3$; $R_6$ and $R_8$ can independently be a $C_1$-$C_2$ alkyl; $R_7$ can be a $C_6$-$C_{20}$ alkyl or a $C_6$-$C_{20}$ arylalkyl; and $X_2$ can be an anionic counterion.

In some examples, the hydrophobic cationic monomer can be dimethylaminoethylmethacrylate benzyl chloride salt (DMAEM.BCQ), dimethylaminoethylacrylate benzyl chloride salt (DMAEA.BCQ), dimethylaminoethylacrylate cetyl chloride salt, and the like. In some examples, the hydrophobic cationic monomer can be DMAEA.BCQ.

BRIEF DESCRIPTION OF THE DRAWINGS

The advantages and various embodiments of the present invention will become apparent to those skilled in the art upon an understanding of the following detailed description, read in light of the accompanying drawings which are made a part of this specification.

DETAILED DESCRIPTION

Figure 1:
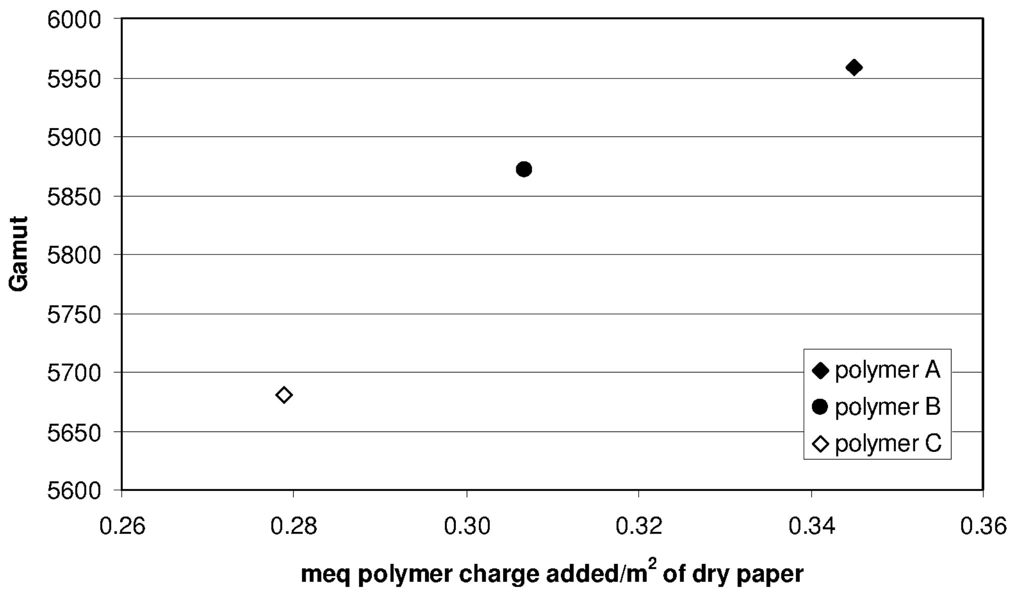
FIG. 1 is a graph of gamut of prints obtained with pigmented inks on a paper surface treated with polymers from Example 3 plotted versus an amount of polymer charge of the respective polymer added per square meter of dry paper.

It can be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure can repeat reference numerals and/or letters in the various exemplary embodiments and across the Figures provided herein. This repetition can be for the purpose of simplicity and clarity and does not in itself dictate a relationship between the various exemplary embodiments and/or configurations discussed in the Figures. Moreover, the formation of a first feature over or on a second feature in the description that follows can include embodiments in which the first and second features are formed in direct contact and can also include embodiments in which additional features can be formed interposing the first and second features, such that the first and second features cannot be in direct contact. The exemplary embodiments presented below also can be combined in any combination of ways, i.e., any element from one exemplary embodiment can be used in any other exemplary embodiment, without departing from the scope of the disclosure. The figures are not necessarily to scale and certain features and certain views of the figures can be shown exaggerated in scale or in schematic for clarity and/or conciseness.

Additionally, certain terms are used throughout the following description and claims to refer to particular components. As one skilled in the art will appreciate, various entities can refer to the same component by different names, and as such, the naming convention for the elements described herein is not intended to limit the scope of the invention, unless otherwise specifically defined herein. Further, the naming convention used herein is not intended to distinguish between components that differ in name but not function. Furthermore, in the following discussion and in the claims, the terms "including" and "comprising" are used in an open-ended fashion, and thus should be interpreted to mean "including, but not limited to."

All numerical values in this disclosure can be exact or approximate values ("about") unless otherwise specifically stated. Accordingly, various embodiments of the disclosure can deviate from the numbers, values, and ranges disclosed herein without departing from the intended scope.

The term "or" can be intended to encompass both exclusive and inclusive cases, i.e., "A or B" can be intended to be synonymous with "at least one of A and B," unless otherwise expressly specified herein. The indefinite articles "a" and "an" refer to both singular forms (i.e., "one") and plural referents (i.e., one or more) unless the context clearly dictates otherwise.

The terms "up" and "down"; "upward" and "downward"; "upper" and "lower"; "upwardly" and "downwardly"; "above" and "below"; and other like terms as used herein refer to relative positions to one another and are not intended to denote a particular spatial orientation since the apparatus and methods of using the same can be equally effective at various angles or orientations.

A detailed description will now be provided.

Definitions

"Alkyl" means a monovalent group derived from a straight or branched chain saturated hydrocarbon by the removal of a single hydrogen atom. Representative alkyl groups include methyl, ethyl, propyl, and the like.

"Alkylene" means a divalent group derived from a straight or branched chain saturated hydrocarbon by the removal of two hydrogen atoms. Representative alkylene groups include methylene, ethylene, propylene, and the like.

"Anionic counterion" means any organic or inorganic anion which can neutralize the positive charge on the quaternary nitrogen atom of a cationic monomer as defined herein. Representative anionic counterions include halide, sulfate, phosphate, monohydrogen phosphate, and nitrate.

"Aryl" means an aromatic monocyclic or multicyclic ring system of about 6 to about 20 carbon atoms, preferably of about 6 to about 10 carbon atoms. The aryl can be optionally substituted with one or more alkyl, alkoxy, halide or haloalkyl groups. Representative aryl groups can include, but are not limited to, phenyl or naphthyl, or substituted phenyl or substituted naphthyl. A preferred substituent can be alkyl.

"Arylalkyl" means an aryl-alkylene-group, where aryl and alkylene are defined herein. Arylalkyl can include benzyl, phenylethyl, phenylpropyl, and 1-naphthylmethyl.

"Charge density" of a cationic polymer, as defined herein, is the mole % of cationic monomers present in the cationic polymer. Charge density expressed in milliequivalents/gram (meq/g) of polymer can be calculated from the charge density expressed in mole % and the molecular weight of the cationic monomers present in the polymer.

"Derived" when referring to a repeating unit, as defined herein, means that the repeating unit has substantially the same structure as a monomer from which it was made, where the terminal olefin has been transformed during the process of polymerization. For example, when a carbon-carbon double bond of a terminal olefin is transformed to a carbon-carbon single bond during the process of polymerization.

"Measured charge density" of a cationic polymer, as defined, herein is the charge density in meq/g of polymer measured experimentally by colloid titration, which means by titrating the cationic polymer with a standard solution of a polyelectrolyte with an anionic charge and employing an end-point detection method to assess the amount of polyelectrolyte required to reach charge neutralization. The measured charge density represents the cationic polymer charge available for interaction with the anionic polyelectrolyte titrant. The measured charge density can be utilized to assess the capability of the cationic polymer to interact with the ink leading to its fixation/insolubilization.

"Color Gamut" or "Gamut" means an indication of the ability of a substrate to develop color when printed. Color Gamut can be quantified by measuring the CIE Lab color coordinates a* and b* for surfaces printed with the process colors cyan, magenta and yellow, and the complementary colors green, red, and blue. When the values obtained are plotted on a diagram, a hexagon is obtained and the area of the hexagon represents the gamut. Higher numbers indicate higher intensity of color developed upon printing.

"Color-to-Color Bleed" or "Inter-Color Bleed" means the tendency of wet ink of one color to bleed into wet ink of another color. Color-to-Color bleed can be measured by the difference between the width of a line printed on a solid color print and the width of the line on an unprinted area.

"Colorant" means a composition of matter that is deposited on the substrate. As used in this definition, "color" includes the full chromatic spectrum as well as black, white, and every shade of gray. Colorants present in inks can be dyes or pigments or a mixture of one or more dyes and one or more pigments.

"Dispersion polymers" means polymers that are made by a precipitation polymerization process which produces well defined particles. Polymerization occurs in a salt solution in which the monomers are soluble. The polymer is insoluble in said salt solution and precipitates as discrete particles. The particles are kept suspended using appropriate stabilizers. There are no surfactants or oil present and the polymers are solubilized by simple mixing with water. Representative examples of dispersion polymerization of water-soluble polymers in an aqueous continuous phase can include those disclosed in U.S. Pat. Nos. 4,929,655; 5,006,590; 5,597,859; 5,597,858; and EP Patent Nos. 630909 and 657478.

"Composition" means a substrate as defined herein that has been surface treated. "Paper composition" is a composition in which the substrate is paper. A paper composition can include, but is not limited to, any type of paper that is surface treated such as uncoated paper, woodfree paper, mechanical paper, inkjet printing paper, copy paper, coated paper, or paperboard.

"Hydrophilic cationic monomer" means a monomer that has a net positive charge and is hydrophilic in nature. An example of a hydrophilic cationic monomer can be one selected from the group consisting of: diallyl-N,N-dimethylammonium halides, and a monomer of the formula I:

I

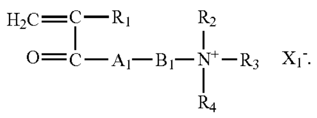

In some examples, $A_1$ can be O or NH; $B_1$ can be a $C_2$-$C_4$ alkylene or hydroxypropylene; $R_1$ can be H or $CH_3$; $R_2$ and $R_4$ can independently be a $C_1$-$C_2$ alkyl; $R_3$ can be H or a $C_1$-$C_2$ alkyl; and $X_1$ can be an anionic counterion.

"Hydrophilic cationic dispersion polymer" means a polymer that contains repeating units derived from at least one hydrophilic cationic monomer, and optionally at least one hydrophobic cationic monomer. The hydrophilic cationic dispersion polymer can contain a higher mole % of repeating units derived from hydrophilic cationic monomers than hydrophobic cationic monomers.

"Hydrophobic cationic monomer" means a monomer that has a net positive charge and is hydrophobic in nature. An example of a hydrophobic cationic monomer can be one selected from the group consisting of: a monomer of the formula II:

II

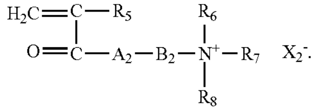

In some examples, $A_2$ can be O or NH; $B_2$ can be a $C_2$-$C_4$ alkylene or hydroxypropylene; $R_5$ can be H or $CH_3$; $R_6$ and $R_8$ can independently be a $C_1$-$C_2$ alkyl; $R_7$ can be a $C_6$-$C_{20}$ alkyl or a $C_6$-$C_{20}$ arylalkyl; and $X_2$ can be an anionic counterion.

"Hydrophobic cationic dispersion polymer" means a polymer that contains repeating units derived from at least one hydrophobic cationic monomer, and optionally at least one hydrophilic cationic monomer. The hydrophobic cationic dispersion polymer can contain a lower mole % of repeating units derived from hydrophilic cationic monomers than hydrophobic cationic monomers so that its hydrophobic characteristics are maintained.

"Nonionic monomer" means a monomer as defined herein that is electrically neutral.

"Latex Polymers" also known as "Water-in-Oil Inverse Suspension" are polymers made by an inverse suspension polymerization using a hydrocarbon (oil) based continuous phase and various surfactants to provide emulsion stability. Polymerization occurs in aqueous monomer droplets suspended in oil. High molecular weight polymers such as flocculants can be prepared by this process. Prior to use, the product generally has to be converted to a water continuous solution through the use of another surfactant.

"Optical Density" means the degree of darkness of the printed ink layer. The higher the optical density reading, the better the dye and/or pigment is fixed on the top of the substrate/coating surface where they produce the best-looking print result. Optical Density can be measured with a reflectometer with a 45/0 geometry. Optical Density (OD) can be considered to agree with the percentage of color saturation in printing and is represented by the following equation:

$$OD = \log(R_\infty / R_{print})$$

where $R_\infty$ is the reflectivity of the substrate and $R_{print}$ is the reflectance factor of the printed surface of the substrate. To measure prints of different colors with the same light source, color filters can be fitted in the beam path of densitometers. The color filters can be matched to the process inks, cyan, magenta, yellow and black. The color filters can possess the complementary color to the color to be measured (e.g., blue filter for yellow, green filter for magenta, red filter for cyan). Densitometers can be equipped with polarization filters to remove specular reflection.

"Papermaking Process" or "Papermaking" means any portion of a method of making paper products from pulp comprising forming an aqueous cellulosic papermaking furnish, draining the furnish to form a sheet and drying the sheet. The steps of forming the papermaking furnish, draining and drying may be carried out in any conventional manner generally known to those skilled in the art. The papermaking process may also include a pulping stage, i.e. making pulp from a lignocellulosic raw material and bleaching stage, i.e., chemical treatment of the pulp for brightness improvement, papermaking is further described in the reference Handbook for Pulp and Paper Technologists, 3rd Edition, by Gary A. Smook, Angus Wilde Publications Inc., (2002) and The Nalco Water Handbook (3rd Edition), by Daniel Flynn, McGraw Hill (2009) in general and in particular pp. 32.1-32.44.

"Print Quality" means the final result of the printing, i.e., the quality of the printed image and characters. Print quality definition does not have absolute terms. It depends on the final use of the printed product. Print quality depends greatly on the printing process itself, and the materials used in printing, namely the substrate and ink used. Print quality can be specified through the quality of color, the reproduction of tone values, the precision of multicolor overprinting, and the surface properties of the printed image of the entire sheet. Print quality of printed products is controlled visually, and through the use of a series of measuring techniques. Those utilized as quality criteria for ink jet papers can include Optical Density, Color Gamut, and Color-to-Color Bleed.

"Printability" is the ability of the substrate to accept ink, as influenced by the properties of the substrate itself, the type of ink used and the printing process variables. In other words, printability is the quality potential of the substrate in printing.

"RSV" stands for Reduced Specific Viscosity. RSV can be an indication of polymer chain length and average molecular weight. RSV is measured at a given polymer concentration and temperature and calculated as follows:

$$RSV = [(\eta / \eta_o) - 1]c$$

where, $\eta$=viscosity of polymer solution, $\eta_o$=viscosity of solvent at the same temperature, c=concentration of polymer in solution. As used herein, the units of concentration "c" are (grams/100 ml or g/deciliter). Therefore, the units of RSV are dl/g. RSV can be measured at a polymer concentration of 0.045%, with the polymer dissolved in either 1 N or 0.125 N sodium nitrate or ammonium nitrate solution. RSV can be measured at a temperature of 30° C. The viscosities $\eta$ and $\eta_o$ can be measured using a Cannon-Ubbelohde semimicro dilution viscometer, size 75. The viscometer is mounted in a perfectly vertical position in a constant temperature bath. When two polymers of the same composition have similar RSV's that can be an indication that they have similar molecular weights.

"Size Press" means the part of the papermaking process where the dry paper is rewet by applying a liquid mixture containing surface additives such as starch, sizing agents and optical brightening agents, a more detailed descriptions of size press is described in the reference Handbook for Pulp and Paper Technologists, 3rd Edition, by Gary A. Smook, Angus Wilde Publications Inc., (2002). The liquid mixture can be, but is not limited to, aqueous solutions.

"Solution Polymers" means polymers made by a polymerization process in which the reaction occurs in a solvent, e.g., water, wherein both the monomers and polymer are soluble.

"Substrate" means a mass or precursor generally in the form of sheet or web that can be surface treated, for example going through the size press of the papermaking process.

"Water Fastness" means a measure of the dissolution of the ink from a print image when it comes into contact with water.

In some examples, a hydrophilic cationic dispersion polymer can be deposited or otherwise disposed onto a surface of a substrate. The hydrophilic cationic dispersion polymer as defined herein can be or can include, but is not limited to, (a) a nonionic monomer; (b) a hydrophilic cationic monomer; (c) and optionally a hydrophobic cationic monomer. The nonionic monomer can be at least one electrically neutral monomer that can be selected from acrylamide, methacrylamide, N-methylacrylamide, N,N-dimethyl(meth)acrylamide, N-isopropyl(meth)acrylamide, N-(2-hydroxypropyl)methacrylamide, N-methylolacrylamide, N-vinylformamide, N-vinylacetamide, N-vinyl-N-methylacetamide, poly(ethylene glycol)(meth)acrylate, poly(ethylene glycol) monomethyl ether mono(meth)acryate, N-vinyl-2-pyrrolidone, glycerol mono((meth)acrylate), 2-hydroxyethyl(meth)acrylate, vinyl methylsulfone, and vinyl acetate. In some examples, the nonionic monomer can be acrylamide or methacrylamide. The hydrophilic cationic monomer can be selected from the group consisting of: a diallyl-N,N-dimethylammonium halide and at least one monomer of the formula I:

I

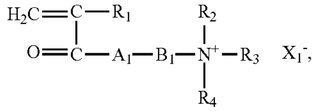

where $A_1$ can be O or NH; $B_1$ can be a $C_2$-$C_4$ alkylene or hydroxypropylene; $R_1$ can be H or $CH_3$; $R_2$ and $R_4$ can independently be a $C_1$-$C_2$ alkyl; $R_3$ can be H or a $C_1$-$C_2$ alkyl; and $X_1$ can be an anionic counterion. In some examples, the hydrophilic cationic monomer can be dimethylaminoethylacrylate methyl chloride salt (DMAEA.MCQ), dimethylaminoethylmethacrylate methyl chloride salt (DMAEM.MCQ), dimethylaminoethylmethacrylate methyl sulfate salt (DMAEM.MSQ), dimethylaminoethylacrylate methyl sulfate salt (DMAEA.MSQ), methacrylamidopropyl trimethylammonium chloride (MAPTAC), or acrylamidopropyl trimethylammonium chloride (APTAC). In some examples, the hydrophilic cationic monomer can be DMAEA.MCQ. In some examples the hydrophilic cationic monomer can be diallyl-N,N-dimethylammonium chloride (DADMAC). In some examples, the hydrophobic cationic monomer can be at least one monomer of the formula II:

II

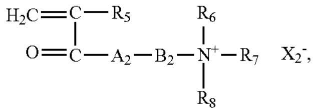

where $A_2$ can be O or NH; $B_2$ can be a $C_2$-$C_4$ alkylene or hydroxypropylene; $R_5$ can be H or $CH_3$; $R_6$ and $R_8$ can independently be a $C_1$-$C_2$ alkyl; $R_7$ can be a $C_6$-$C_{20}$ alkyl or a $C_6$-$C_{20}$ arylalkyl; and $X_2$ can be an anionic counterion.

In some examples, the hydrophobic cationic monomer can be dimethylaminoethylmethacrylate benzyl chloride salt (DMAEM.BCQ), dimethylaminoethylacrylate benzyl chloride salt (DMAEA.BCQ), dimethylaminoethylacrylate cetyl chloride salt, and the like. In some examples, the hydrophobic cationic monomer can be DMAEA.BCQ.

In some examples, the hydrophilic cationic dispersion polymer can have a cationic charge density from about 5 mole % to about 80 mole %, from about 10 mole % to about 60 mole %, or from about 10 mole % to about 50 mole %. In some examples, the hydrophilic cationic dispersion polymer can include about 20 mole % to about 95 mole %, about 40 mole % to about 90 mole %, or about 50 mole % to about 90 mole % of repeating units derived from a nonionic monomer. In some examples, the hydrophilic cationic dispersion polymer can include about 5 mole % to about 80 mole %, about 10 mole % to about 60 mole %, or about 10 mole % to about 50 mole % of repeating units derived from a hydrophilic cationic monomer. In some examples, the hydrophilic cationic dispersion polymer contains from 0 mole % to about 40 mole %, from 0 mole % to about 30 mole %, from 0 mole % to about 20 mole %, from 0 mole % to about 10 mole %, from 0 mole % to about 5 mole % of repeating units derived from a hydrophobic cationic monomer. In some examples, the hydrophilic cationic dispersion polymer contains less than about 40 mole %, less than about 30 mole %, less than about 20 mole %, less than about 10 mole %, less than about 5 mole % of repeating units derived from a hydrophobic cationic monomer. In some examples, the hydrophilic cationic dispersion polymer can contain from 0.1 mol % to about 40 mole %, from 0.5 mol % to about 30 mole %, from 1 mole % to about 20 mole %, from 1.5 mol % to about 10 mole %, or from 2 mol % to about 5 mole % of repeating units derived from a hydrophobic cationic monomer. In any case, the hydrophilic cationic dispersion polymer contains a higher mole % of repeating units derived from hydrophilic cationic monomers than hydrophobic cationic monomers so that its hydrophilic characteristics are maintained.

It has been surprisingly and unexpectedly discovered that ink jet printability of a substrate can be enhanced if its surface is treated with a composition that includes a hydrophilic cationic dispersion polymer. The hydrophilic cationic dispersion polymers show good film forming capabilities when applied to the surface of a substrate. Substrates that include a hydrophilic cationic dispersion polymer when ink jet printed with pigmented or dyes-based inks display improved print quality compared to substrates made of the same materials, but without the hydrophilic cationic dispersion polymer of the invention.

The hydrophilic cationic dispersion polymer can be made by mixing or otherwise combining one or more nonionic monomers, one or more hydrophilic cationic monomers, and optionally one or more hydrophobic monomers to produce a mixture. In some examples, the one or more nonionic monomers, the one or more hydrophilic cationic monomers, the one or more optional hydrophobic monomers, and water can be mixed or otherwise combined to produce an aqueous mixture. In some examples, the monomers can be polymerized to produce the hydrophilic cationic dispersion polymer with the use of radical-forming agents or initiators. In some examples, polyvalent anionic salts, particle stabilizing polymers, multifunctional alcohols, chain transfer agents, seed polymers, pH buffers, chelants, and/or other polymerization additives can also be mixed, blended, or otherwise combined with the monomers to produce the mixture. In some examples, polyvalent anionic salt can be a sulfate, a phosphate or mixture thereof. In some examples, the polyvalent anionic salt can be ammonium sulfate, sodium sulfate, ammonium hydrogen phosphate, sodium hydrogen phosphate, potassium hydrogen phosphate, ammonium chloride or a mixture thereof. In some examples, when water is present, the amount of polyvalent anionic salt added in the preparation of the hydrophilic cationic dispersion polymers can be about 10 weight % or more, or about 15 weight % or more based on the total weight of the aqueous mixture.

In some examples, one or more stabilizers, also referred to as particle stabilizers or dispersants can also be mixed, blended, or otherwise combined with the monomers. In some examples, the particle stabilizer can be a polymer. Particle stabilizing polymers can facilitate the formation of fine polymer particles and keep the formed polymer particles from becoming agglomerated and forming a gel rather than a fine dispersion of particles. The particle stabilizing polymer can be a water-soluble cationic polymer which is soluble in the above described polymerization mixture. The particle stabilizing polymer can be used in amount from about 1 weight % to about 10 weight % based on the total weight of the dispersion polymer. The dispersant function of the particle stabilizing polymer is not greatly affected by molecular weight. The weight average molecular weight ($M_w$) of the usable dispersant can be from about 10,000 Daltons to about 10,000,000 Daltons. The particle stabilizing polymers can be homopolymers of cationic N,N-disubstituted-aminoethyl(meth)acrylate or diallyl disubstituted ammonium halide monomers and their quaternary salts or copolymers comprising at least 20 mole % or more of cationic N,N-disubstituted-aminoethyl(meth)acrylate or diallyl disubstituted ammonium halide monomers and their quaternary salts and one or more nonionic monomers. Particle stabilizing polymers can include homopolymers of DMAEA.MCQ and DMAEM.MCQ and DADMAC.

In some examples, one or more multifunctional alcohols can also be mixed, blended, or otherwise combined with the monomers. In some examples, the multifunctional alcohol can be glycerin and/or polyethylene glycol.

In some examples, one or more chain transfer agents can also be mixed, blended, or otherwise combined with the monomers as defined herein at the start of the polymerization to make the mixture or continuously or in portions during polymerization of the monomers or after polymerization has occurred. Chain transfer agents can be used to control the molecular weight of the cationic dispersion polymers. Representative chain transfer agents can include those listed by K. C. Berger and G. Brandrup in Transfer Constant to Monomer, Polymer, Catalyst, Solvent, and Additive, in Free Radical Polymerization, Section II, pp. 81-151, in Polymer Handbook edited by J. Brandrup and E. H. Immergut, 3rd edition, John Wiley & Sons, New York (1989), and in G. Odian, Principles of Polymerization, 2nd edition, John Wiley & Sons, New York (1981). In some examples, chain transfer agents can include alcohols such as methanol, ethanol, 1-propanol, 2-propanol, butyl alcohol, glycerol, and polyethylene glycol and the like, sulfur compounds such as alkylthiols, thioureas, sulfites and disulfides, carboxylic acids such as formic and malic acid and their salts, and phosphites such as sodium hypophosphite and combinations thereof. In some examples, the chain transfer agent can be 2-propanol. In some examples, the chain transfer agents can be ethanediol, thiourea and sodium bisulfite. In some examples, the chain transfer agents can be formic acid and its salts. In some examples the chain transfer agents can be sodium hypophosphite and/or sodium formate.

In some examples, one or more suitable water-soluble radical-forming agents or initiators can also be mixed, blended, or otherwise combined with the monomers. Thermally derived radicals, in which the radical species results from thermal, homolytic dissociation of an azo, peroxide, hydroperoxide and perester compound are preferred. In some examples, the initiator can be a water-soluble azo compound such as 2,2'-azobis(2-amidinopropane)dihydrochloride, and 2,2'-azobis(2-(2-imidazolin-2-yl)propane)dihydrochloride), 2,2'-azobis(isobutyronitrile) (AIBN), 2,2'-azobis(2,4-dimethylvaleronitrile) (AIVN), and the like.

In some examples, one or more seed polymers can also be mixed, blended, or otherwise combined with the first monomer and the second monomer. The seed polymer can be a water-soluble dispersion polymer which is insoluble in the salt media. In some examples, the seed polymer can be the water-soluble dispersion polymer prepared in a previous reaction which used the same monomer mixture. In some examples, the composition of the seed polymer need not be similar to the composition being formed.

In a typical procedure for preparing the dispersion polymer, an aqueous solution containing one or more nonionic monomers, one or more hydrophilic cationic monomers, and one or more hydrophobic cationic monomers, one or more polyvalent anionic salts, one or more stabilizers, any additive such as chain transfer agents, multifunctional alcohols, chelants, pH buffers, can be charged to a reactor equipped with a mixer, a thermocouple, a nitrogen purging tube, and a water condenser. Mechanical agitation can be started, and the reactor contents can be heated to the desired temperature, and then the initiator can be added. The solution can be purged with nitrogen while maintaining temperature and mixed for several hours. After this time, the mixture can be cooled to room temperature, and any post polymerization additive such as additional polyvalent anionic salts, water, stabilizers, multifunctional alcohols, chain transfer agents, chelants, pH buffers, anti-foaming and biocidal agents can be charged to the reactor. Additional polyvalent anionic salts can be added during the polymerization to maintain processability or influence final product quality. Moreover, additional initiator can be added during the reaction to achieve desired conversion rates and facilitate reaction completeness.

The polymerization process can be carried out as batch or semi-batch process. In a batch process, all of the reactive monomers can be initially added to the reactor. In a semi-batch polymerization process one or more of the monomers used in the synthesis of the polymer can be held out in part or whole at the beginning of the reaction and added over time over the course of the polymerization. If acrylamide monomer is used as a semi-batch monomer, a chelant can be added. Suitable processes for making the hydrophilic cationic dispersion polymers can include those disclosed in U.S. Pat. Nos. 6,025,426; 6,059,930; and 7,473,334.

In some examples, the hydrophilic cationic dispersion polymer can be deposited on a surface of the substrate. In some examples, the substrate can be a paper, a textile, a non-woven material, a film or mixtures thereof. Any suitable paper can be employed. In some examples, the paper can be made of any type of lignocellulosic fibers, including for example fiber obtained from pulping hardwood trees and softwood trees. In some examples, the paper can be made of recycled fibers and/or polymeric plastic fibers. In some examples, the paper contains predominantly cellulosic fibers. In some examples, the paper contains substantially entirely cellulosic fibers. In some examples, the paper can be of various types such as those used for the production of uncoated paper, woodfree paper, mechanical paper, inkjet printing paper, copy paper and coated paper. Coated paper is treated with a wide range of fillers and binders. In some examples, the paper can be a paperboard of various types such as those used for the production of boxboard, linerboard, bleached board or packaging. In some examples, the textile can be a flexible material that can include a network of natural and/or synthetic fibers (yarn or thread) that can be formed by weaving, knitting, crocheting, knotting, tatting, felting, or braiding. In some examples, the non-woven material can be a fabric-like material made from short and/or long fibers that can be bonded and/or entangled together by mechanical, chemical, heat, and/or solvent treatment. In some examples, the film can be a transparent film or an opaque film. In some examples, the film can be a polyester film. The substrate can be in the form of sheet of web. The substrate can be of any basis weight. In some examples, the substrate basis weight can be from about 20 to about 500 $g/m^2$, from about 60 to about 100 $g/m^2$, from about 20 to about 50 $g/m^2$, from about 120 to about 400 $g/m^2$.

It has been surprisingly and unexpectedly discovered that ink jet printing performance of any substrate, independently from its characteristics, can be improved by the presence of the hydrophilic cationic dispersion polymers whenever printing is conducted with pigmented or dye-based ink, without the need of applying a specialty coating onto the substrate.

Application of the hydrophilic cationic dispersion polymer to the surface of the substrate can be either performed as a post-production operation or as a portion of the manufacturing process for that paper substrate. In some examples, the hydrophilic cationic dispersion polymer can be added at any point after the paper is formed in the papermaking process. In some examples, the hydrophilic cationic dispersion polymer can be applied in the size press of the papermaking process after the paper substrate has been formed and dried but not passed through a calender stack. The formed sheet (web) having a dry surface can be conducted through a size press (a blade, rod or roll coater of various configurations) which re-wets its surface to some degree (depending, at least in part, on the type of size press) with a liquid mixture. After passing through the size press, the sheet (web) can be dried and subsequently passed through a series of nips at the calender to form a paper composition as defined herein, prior to wind-up, slitting or sheeting.

In some examples, the paper composition can include about 0.02 weight % to about 0.7 weight % of the hydrophilic cationic dispersion polymer or about 0.1 weight % to about 0.5 weight % of the hydrophilic cationic dispersion polymer, based on the weight of the paper substrate. In other examples, the paper composition can include about 0.05 weight % to about 0.6 weight % of the hydrophilic cationic dispersion polymer or about 0.15 weight % to about 0.4 weight % of the hydrophilic cationic dispersion polymer, based on a dry weight of the paper substrate.

In some examples, the hydrophilic cationic dispersion polymer can be applied to the substrate, e.g., a paper substrate in the form of a sheet or web, using a conventional metered or non-metered size press. The hydrophilic cationic dispersion polymer can be applied to both sides of the substrate or to only one side of the substrate. Any size press designs can be used, including but not limited to, horizontal press, vertical press, gate roll size press and metering blade size press, rod, puddle type, or combinations thereof.

In some examples, the hydrophilic cationic dispersion polymer can also be applied to the substrate using other methods and techniques (e.g., spraying, doctor bars, or other conventionally used coating equipment). For example, it can be applied to the calender or calender stack using a calender spray boom, or the like. Alternatively, the hydrophilic cationic dispersion polymer can be primed on the substrate in a printing device. For example, the hydrophilic cationic dispersion polymer can be primed on the substrate in a printing device before printing an ink thereon. Any printing device can be used so far as it can effectively eject the hydrophilic cationic dispersion polymer and, if used, ink out of an orifice to apply the hydrophilic cationic dispersion polymer and, if used, the ink to the printing substrate. In some examples, an ink jet printer can be used to print on the substrate containing the hydrophilic dispersion polymer. In some examples, the ink can contain pigments and/or dyes. In some examples, the ink jet printing device can be equipped with a system that primes directly the hydrophilic cationic dispersion polymer on the substrate before printing the ink thereon. In some examples, an anilox roller can be used to apply the hydrophilic dispersion polymer. In other examples, the hydrophilic cationic dispersion polymer can be applied to the substrate using a coating device, e.g., blade coater, film coater, curtain coater, spray coater, roll coater, rod coater and the like, which are well-known in the art. Illustrative processes that can be used to apply the hydrophilic cationic dispersion polymer to the substrate can include those described in U.S. Patent Application Publication Nos.: 2012/0206533 and 2019/0375223 and WO Publication No.: WO2015/023274.

In some examples, the hydrophilic cationic dispersion polymer can be applied to a substrate as part of a liquid mixture. The liquid mixture may be aqueous based, hydrocarbon based, organic solvent based, emulsion based (water-in-oil, oil-in-water). Typically, the liquid mixture is aqueous based. The hydrophilic cationic dispersion polymers are soluble in water and can be diluted with water prior to use without the need of specialized mixing equipment. The liquid mixture can be an aqueous solution containing only the hydrophilic cationic dispersion polymer. In some examples, this aqueous solution can contain at least about 0.2 weight %, at least about 0.5 weight %, at least about 1 weight %, at least about 2 weight %, at least about 3 weight %, at least about 4 weight %, at least about 5 weight %, at least about 6 weight %, at least about 10 weight % of the hydrophilic cationic dispersion polymer based on the total weight of the liquid mixture. In some examples, this aqueous solution can contain less than about 0.5 weight %, less than about 1 weight %, less than about 2 weight %, less than about 3 weight %, less than about 4 weight %, less than about 5 weight %, less than about 6 weight %, less than about 10 weight % of the hydrophilic cationic dispersion polymer based on the total weight of the liquid mixture.

In some examples, the liquid mixture containing the hydrophilic cationic dispersion polymer can contain other additives conventionally applied to the surface of paper, such as starch, sizing agents, pigments, salts, surfactants, and defoamers. The selection and amount of additives can depend, at least in part, on the specific paper product produced and is within the purview of a person of ordinary skill in the art of papermaking. Any type of starch may be used including cationic, nonionic or anionic starch. In some examples, the starch can be naturally occurring carbohydrates synthesized in corn, tapioca, potato and other plants by polymerization of dextrose units. In some examples, the starch can be starch acetates, starch esters, starch ethers, starch phosphates, starch xanthates, or a mixture thereof. In some examples, the sizing agent can be a rosin-based product, an alkenyl succinic anhydride, an alkyl ketene dimer, a styrene-maleic anhydride copolymer, a styrene-acrylate copolymer, a polyurethane, or a mixture thereof.

In some examples where the liquid mixture containing the hydrophilic cationic dispersion polymer also contains starch, the hydrophilic cationic dispersion polymer can be added in neat form or after dilution with water to an aqueous starch solution. In some examples, prior to combining with a hydrophilic cationic dispersion polymer, aqueous starch solutions can contain about 2 weight % to about 20 weight %, about 4 weight % to about 16 weight %, or about 6 weight % to about 12 weight % of starch based on the weight of the aqueous solution. In some examples, the liquid mixture containing hydrophilic cationic dispersion polymer and starch can include at least about 50 weight % of starch and from about 1 weight % to about 50 weight % of the hydrophilic cationic dispersion polymer, based on the total dry weight of polymer and starch. In some examples of the liquid mixture, the ratio of the dry weight of the hydrophilic cationic dispersion polymer to the dry weight of the starch ranges from about 1:1 to about 1:30, about 1:1 to about 1:25, about 1:1 to about 1:20, about 1:1 to about 1:15, about 1:1 to about 1:10, about 1:1 to about 1:7, about 1:1 to about 1:5, about 1:2 to about 1:5. Dry weight as defined herein is the weight determined by weighing the mass that remains after removing the water or solvent from the liquid mixture under mild conditions. For example, drying in an oven at 105° C. until the weight of the sample remains constant (±5%).

The hydrophilic cationic dispersion polymers, as defined herein, can be free-flowing compositions with low viscosity. In some examples, the hydrophilic cationic dispersion polymer, as defined, herein can have a RSV of less than about 22 dL/g, less than about 12 dL/g, less than about 10 dL/g, less than about 6 dL/g, less than about 5 dL/g, less than about 4 dL/g, about 0.2 to about 22 dL/g, about 0.2 to about 12 dL/g, about 0.2 to about 10 dL/g, or about 0.2 to 6 dL/g. In some examples, the hydrophilic cationic dispersion polymer as defined herein can have a RSV of at least about 4 dL/g, at least about 6 dL/g, at least about 8 dL/g, at least about 10 dL/g, at least about 12 dL/g, at least about 15 dL/g. or at least about 20 dL/g. In some examples, the hydrophilic cationic dispersion polymer can have an average molecular weight of at least 300,000 Daltons, at least 500,000 Daltons, at least 1 million Daltons, at least 3 million Daltons, or at least 5 million Daltons. The average molecular weight can be measured by size-exclusion chromatography/multi-angle laser light scattering (or SEC/MALLS) technique known as such for a person skilled in the art.

In some examples, with liquid mixtures containing hydrophilic cationic dispersion polymer and starch, the hydrophilic cationic dispersion polymer can have a RSV of less than about 10 dL/g, less than about 8 dL/g, less than about 7 dL/g, less than about 6 dL/g, less than about 5 dL/g, less than about 4 dL/g, about 0.2 to about 10 dL/g, about 0.2 to about 6 dL/g, or about 0.2 to about 4 dL/g. In some examples, with liquid mixtures containing starch, the hydrophilic cationic dispersion polymer can have an average molecular weight of no more than 5 million Daltons, of no more than 3 million Daltons, of no more than 1 million Daltons, of no more than 500,000 Daltons, or of no more than 300,000 Daltons.

In some examples, the liquid mixture containing cationic dispersion polymer and starch, can have a viscosity of no more than about 800 centipoise (Cp) at about 60° C. or no more than about 500 centipoise (Cp) at about 60° C.

It has been surprisingly and unexpectedly discovered that a surface of a substrate that includes the hydrophilic cationic dispersion polymer leads to improved water fastness of ink jet prints produced with dye-based inks. The hydrophilic cationic dispersion polymers disclosed herein significantly improve water fastness compared to hydrophobic dispersion polymers and latex polymers that have the same meq/g charge density. Considering these results, it can be hypothesized (while not wishing to be bound or limited by any particular theory or mechanism of action) that the hydrophilic cationic dispersion polymer assumes a conformation in which more of its cationic groups are available for interaction with the dyes compared to those available in hydrophobic dispersion polymers and latex polymers.

It has been surprisingly and unexpectedly discovered that for the same level of charge added to the surface of paper, the hydrophilic cationic dispersion polymers provide improved water fastness properties compared to solution polymers. In the hydrophilic cationic dispersion polymers, the cationic monomers are intercalated in between non-ionic segments, whereas in the solution polymers only cationic monomers are present. It can be hypothesized (while not wishing to be bound or limited by any particular theory or mechanism of action) that the spatial arrangement of the cationic monomers in the hydrophilic cationic dispersion polymers facilitate their interaction with dyes, whereas the close vicinity of the cationic monomers in solution polymers is less favorable for this interaction to occur.

It has been surprisingly and unexpectedly discovered that the hydrophilic cationic dispersion polymers improve the gamut of prints obtained with pigmented inks compared to hydrophobic dispersion polymers and latex polymers containing the same cationic monomer mole %. It can be hypothesized (while not wishing to be bound or limited by any particular theory or mechanism of action) that the improved availability of cationic charge groups in the hydrophilic cationic dispersion polymer located on the surface of the substrate leads to improved interaction with the pigments.

It has been surprisingly and unexpectedly discovered that the hydrophilic cationic dispersion polymers improve gamut of prints obtained with pigmented inks compared to solution polymers, even when added at a dosage corresponding to less charge added to paper compared to the solution polymers. It can be hypothesized (while not wishing to be bound or limited by any particular theory or mechanism of action) that the spatial arrangement of the cationic monomers in the hydrophilic cationic dispersion polymers facilitate their interaction with pigments, whereas the close vicinity of the cationic monomers in solution polymers would be less favorable for this interaction to occur.

EXAMPLES

The foregoing discussion can be further described with reference to the following non-limiting examples. Several laboratory experiments have been conducted to measure the ability of the hydrophilic cationic dispersion polymers to improve printability of a paper substrate when applied to its surface and print quality of images and characters printed on paper substrates treated with hydrophilic cationic dispersion polymers.

When polymers were used alone to treat the substrate surface, 1 weight % dispersion polymer solutions in water (that means 1 g of polymer in total 100 g of liquid mixture) were applied to the substrate unless otherwise specified, using a wire wound Meyer rod, namely #3 or #4. The paper substrate was weighed before and after coating to determine the wet pick-up. The paper was then dried at about 98.9° C. using a drum dryer and later conditioned for at least 12 hours at 23° C. and 50% RH before printing.

For compositions containing starch, starch was cooked at about 10 weight % in water (that means 10 g of starch in total 100 g of liquid mixture) at 95° C. for about 30 minutes. The cooked starch was successively diluted to about 5 weight % with water and applied to the paper substrate using a wire wound Meyer rod, namely #3 or #4. Based on the value of wet-pick up obtained, the concentration of starch and polymers was adjusted to get the desired dosage of each component in the final surface-treated paper. The polymer solutions in water were mixed with starch and successively stirred to get a homogeneous mixture. Within about 15 minutes the homogeneous mixture of polymer and starch was applied to a paper substrate using the procedure described above for polymers only.

Ink jet printing was conducted with a Hewlett-Packard Photosmart Pro B9180 inkjet printer that uses pigmented-based inks and with a Canon Pixma MP980 ink jet printer that used a pigmented-based ink for black and dye-based inks for cyan, magenta and yellow colors. The paper was printed using an inkjet test target provided by ImageXpert Inc., Nasha, NH, USA, for the evaluation of print quality attributes. Optical density (print density) of primary solid colors was measured with a Gretag Macbeth D19 c densitometer. For the evaluation of other print characteristics, such as line width, inter-color bleed and color gamut an ImageXpert Xaminer Junior System was utilized. The printed sheets were loaded on the document feeder of an Epson Expression 10000 XL flat-bad scanner for automated image capture and analysis via ImageXpert software. The system automatically recognized the inkjet test target and applies the appropriate measurements. Line width is the average of the widths of lines printed in both horizontal and vertical orientation. This was determined for K, C, M, and Y colors. Line raggedness (standard deviation of line width) is the measurement of contour irregularity and was determined for K, C, M, and Y colors and for lines printed in both horizontal and vertical orientation. All primary color combinations were also evaluated for inter-color bleed (K on Y, K on M, K on C, C on Y, M on Y, and M on C). Inter-color bleed is the tendency of wet ink of one color to bleed into wet ink of another color. Bleed is reported as the difference in line width of line printed on the solid ink area and the line printed on paper. Bleed was determined for lines printed in both horizontal and vertical orientation. The system was calibrated for automatic determination of CIE Lab L*, a*, and b* coordinates. Gamut areas values were derived from plots of a* and b* coordinates for the colors cyan, magenta and yellow, and the complementary colors green, red, and blue.

For the measurement of water fastness, optical density ($OD_0$) of the solid prints, cyan, magenta and yellow, were measured. The solid prints of rectangular shape were then cut out of the ink jet test target and immersed in deionized water for 5 minutes without agitation. After being dried for about 12 hours at TAPPI room conditions (23° C. and 50% RH), their optical density ($OD_w$) was measured, to determine water fastness of the prints using the following equation:

$$\text{Water fastness, \%} = OD_w / OD0_0 \times 100$$

The polymers used are summarized in Table 1.

TABLE 1

| Polymer | Polymer Type | Description | RSV[b] |
|---|---|---|---|
| A | Dispersion | 10/90 mole ratio/poly-(DMAEA•MCQ/AcAm) | 18 |
| B[a] | Dispersion | 10/90 mole ratio/poly-(DMAEA•BCQ/AcAm) | 18 |
| C[a] | Latex | 10/90 mole ratio/poly-(DMAEA•MCQ/AcAm) | 17 |
| D | Dispersion | 40/60 mole ratio/poly-(DADMAC/AcAm) | 0.7 |
| E | Dispersion | 30/70 mole ratio/poly-(DADMAC/AcAm) | 4 |
| F[a] | Latex | 30/70 mole ratio/poly-(DADMAC/AcAm) | 4 |
| G[a] | Dispersion | 50/50 mole ratio/poly-(DMAEA•BCQ/AcAm) | 0.4 |
| H[a] | Solution | poly-(EPI-DMA) | 0.3 |
| I[a] | Solution | poly-DADMAC | 0.6 |
| L | Dispersion | 19/17/64 mole ratio/poly-(DMAEA•MCQ/DMAEA•BCQ/AcAm) | 0.7 |

[a]comparative examples;

[b]units are dl/g

Polymers A, B, C, E, F, H and I were acquired from Nalco Water, 1601 West Diehl Road, Naperville, IL 60563. Polymers D and L were synthesized as described in Examples 1 and 2, respectively. Polymer G was synthesized using the procedure described in EP Pat. No. 2376290. In the examples reported herein, polymers B, C, F, G, H, and I are comparative examples and not polymers of the instant invention. "EPI-DMA" stands for epichlorohydrin-dimethylamine. Polymers H and I are typical solution polymers used in papermaking.

The measured charge density was determined by colloid titration using a polyelectrolyte of known molarity as anionic titrant (0.0006 N polyvinylsulfate potassium salt, PVSK), and a Mutek PCD02 particle charge detector manufactured by BTG, Herrching, Germany, to detect the titration end-point. The Mutek device includes a cylindrical sample cell and a piston oscillating within the cylindrical sample cell upon activating an electrical drive. The polymer to be titrated was placed into the cell (0.4-1.5 mg of polymer diluted to 10 mL with deionized water). As the piston moves up and down in the cylinder, the fluid was forced to move opposite the motion of the piston. Electrodes near the top and bottom of the cylinder were attached to an electronic circuit which measures a weak alternating electrical potential. The potential was amplified and rectified to produce a millivolt signal output, indicating the charge on the particles dispersed in the fluid. The titration end-point corresponds to the amount of titrant at which, the streaming potential goes to zero and the Mutek displays 0 mV. Charge density can be derived from the milliliter of PVSK used in the titration according to the formula:

$$\text{Measured Charge Density in } meq/g \text{ polymer} = (\text{mL } PVSK \text{ titrant used}) \times (\text{normality } PVSK \text{ titrant}) / (\text{mass of polymer titrated})$$

Example 1: To a 1500 mL reaction flask fitted with a mechanical stirrer, thermocouple, condenser, nitrogen purge tube, and addition port was added 117.0 g of a 50% aqueous solution of acrylamide, 212.8 g of a 60% aqueous solution of diallyldimethyl ammonium chloride, 43.2 g of a 20% aqueous solution of a homopolymer of dimethylaminoethyl acrylate methyl chloride quaternary salt, 0.4 g of sodium hypophosphite, 225.0 g of ammonium sulfate, 30.3 g of sodium sulfate, 0.20 g of polysilane antifoaming agent, 0.4 g of ethylenediaminetetraacetic tetra sodium salt and 251.2 g of deionized water. The resulting mixture was stirred and heated up to 42° C. Upon reaching 42° C., 0.089 g of a of 2,2'-azobis[2-(2-imidazolin-2-yl)propane]dihydrochloride (VA-044, Wako Chemicals, Dallas, TX) was added to the reaction mixture and the nitrogen purge was started. The temperature was further increased to 60° C. in approximately 30-45 minutes. The reaction was maintained at this temperature for additional 3 hours during which additional 1.42 g of VA-044 initiator and 0.08 g of sodium hypophosphite were added. Next, 47.9 g of a 50% aqueous solution of acrylamide was added to the reaction mixture over the period of 3.5 hours. Additional sodium hypophosphite (0.060 g) and VA-044 initiator (0.04 g) were added during the same period. The dispersion was then further reacted for 1 additional hour. The resulting dispersion polymer D had a Brookfield viscosity of 2348 cps and contained 21% of 40/60 copolymer of DADMAC and acrylamide with RSV of 0.7 dL/g (0.045% solution of the polymer in 1N sodium nitrate at 30° C.).

Example 2: To a 1500 mL reaction flask fitted with a mechanical stirrer, thermocouple, condenser, nitrogen purge tube, and addition port was added 153.71 g of a 50% aqueous solution of acrylamide, 96.3 g of a 80% aqueous solution of dimethylaminoethylacrylate benzyl chloride quaternary salt, 21.2 g of 20% aqueous solution of a homopolymer of dimethylaminoethyl acrylate methyl chloride quaternary salt, 80.5 g of a 80% aqueous solution of dimethylaminoethylacrylate methyl chloride quaternary salt, 45.8 g of a 15% aqueous solution of poly-DADMAC, 1 g of sodium hypophosphite, 161.60 g of ammonium sulfate, 0.23 g of ethylenediaminetetraacetic tetra sodium salt and 426.3 g of deionized water. The resulting mixture was stirred and heated up to 44-46° C. and kept at this temperature for approximately 45 minutes. Nitrogen purging was started and 0.020 g of a of 2,2'-azobis[2-(2-imidazolin-2-yl)propane] dihydrochloride (VA-044, Wako Chemicals, Dallas, TX) was added to the reaction mixture. The temperature was further increased to 48-52° C. in approximately 30-45 minutes. The reaction was maintained at this temperature for additional 3 hours during which additional 0.1 g of VA-044 initiator, 1.62 g of a 70% aqueous solution of terbutyl hydroperoxide and 0.65 g of sodium thiosulfate were added. The reaction was cooled down and 5 g of acetic acid was added. The resulting dispersion polymer L had a Brookfield viscosity of 3716 cps and contained 22% of 19/17/62 terpolymer of DMEAE.MCQ/DMAE.BCQ/AcAm with RSV of 0.7 dL/g (0.045% solution of the polymer in 1N sodium nitrate at 30° C.).

Example 3: The substrate used in this example was commercial multi-purpose copy paper, Navigator™ with nominal basis weight of 80 g/m$^2$. The paper was surface treated with aqueous solutions containing 1 weight % of polymers A, B or C such as to achieve a final polymer dosage based on dry paper of about 0.3 weight %. Polymer A was a hydrophilic cationic dispersion polymer, poly-(DMAEA.MCQ/AcAm). Polymers B and C were used as comparative examples. Polymer B was a hydrophobic dispersion polymer, poly-(DMAEA.BCQ/AcAm). Polymer C was a hydrophilic cationic latex polymer, poly-(DMAEA.MCQ/AcAm). All three polymers had the same 10/90 cationic monomer/AcAm ratio and have similar RSV (RSV=18 dL/g for Polymer A and Polymer B; RSV=17 dL/g for polymer C).

Table 2 summarizes the results of ink jet printing conducted with pigmented inks. It is evident from Table 2 that paper surface-treated with polymer A had improved optical density of the inkjet prints obtained with pigmented inks in comparison with untreated copy paper. Polymer A provided similar optical density to Polymers B and C for black, cyan, magenta colors. Polymer A improved yellow optical density compared to latex Polymer C. Polymer A improved gamut of the prints compared to untreated copy paper, or paper surface-treated with Polymer B or Polymer C.

TABLE 2

Print characteristics results-HP Photosmart Pro B9180 inkjet printer

| | | Optical Density | | | | |
|---|---|---|---|---|---|---|
| Sample | Polymer | Black[a] | Cyan[a] | Magenta[a] | Yellow[a] | Gamut |
| 1 | A | 1.37 | 0.72 | 0.94 | 1.17 | 5959 |
| 2[b] | B | 1.39 | 0.73 | 0.93 | 1.16 | 5872 |
| 3[b] | C | 1.38 | 0.72 | 0.96 | 1.10 | 5681 |
| Copy Paper[b] | — | 1.27 | 0.70 | 0.86 | 0.95 | 5155 |

[a]pigmented ink;
[b]comparative examples

The charge density of the three polymers was measured by colloid titration. Polymer A had the highest measured charge density, 1.44 meq/g, followed by Polymer B, 1.28 meq/g and Polymer C, 1.16 meq/g. The gamut of the prints increased with increasing measured polymer charge density (FIG. 1). Polymer A with the highest measured charge density provided the highest gamut.

Table 3 summarizes the results of ink jet printing conducted with dye-based inks.

TABLE 3

Print characteristics results-Canon Pixma MP980 inkjet printer

| | | Optical Density | | | | |
|---|---|---|---|---|---|---|
| Sample | Polymer | Black[a] | Cyan[b] | Magenta[b] | Yellow[b] | Gamut |
| 1 | A | 2.24 | 1.25 | 1.47 | 1.50 | 7362 |
| 2[c] | B | 2.25 | 1.27 | 1.52 | 1.54 | 7348 |
| 3[c] | C | 2.19 | 1.24 | 1.42 | 1.47 | 7383 |
| Copy Paper[c] | — | 2.01 | 1.13 | 1.24 | 1.30 | 6648 |

[a]pigmented ink;
[b]dye ink;
[c]comparative examples

Table 4 illustrates the improvement of water fastness obtained with polymer A compared to polymer B, Polymer C, and untreated copy paper. Polymer A having the highest measured charge density showed the greatest improvement of water fastness of the prints.

TABLE 4

Water-fastness results-Canon Pixma MP980 inkjet printer

| Sample | Polymer | Cyan[a] | Magenta[a] | Yellow[a] |
|---|---|---|---|---|
| 1 | A | 69.6 | 39.6 | 64.4 |
| 2[b] | B | 65.9 | 39.1 | 57.2 |
| 3[b] | C | 55.2 | 34.9 | 49.4 |
| Copy Paper[b] | — | 31.5 | 22.5 | 43.3 |

[a]dye ink;
[b]comparative examples

Example 4: Polymers A and B were individually mixed with starch (PG-270 from Penford Products) in amounts such as to have the final dosages of starch and polymers based on dry paper illustrated in Table 5. The paper utilized as substrate in Table 5, was a woodfree base paper of basis weight of about 69 g/m$^2$, produced on a paper machine without size press additives. The paper substrate was also surface treated with starch only for comparison.

As shown in Table 5, Polymer A, for all colors, improved optical density of prints obtained with pigmented ink compared to starch by itself. Polymer A improved optical density of black and yellow inks compared to Polymer B. Polymer A improved gamut of prints compared to Polymer B or starch by itself.

Table 6 gives similar data but collected on prints obtained with dye-based inks for cyan, magenta, and yellow colors, and pigmented ink for black. Polymer A improved optical density of all four colors and gamut compared to starch by itself. It afforded slightly lower optical density and gamut than polymer B.

As shown in Table 7, when Polymer A is used in combination with starch, it improved water fastness compared to polymer B or starch by itself.

TABLE 5

Print characteristics results-HP Photosmart Pro 139180 inkjet printer

| | Starch | | Polymer | Optical Density | | | | |
|---|---|---|---|---|---|---|---|---|
| Sample | Dosage[a] | Polymer | Dosage[a] | Black[b] | Cyan[b] | Magenta[b] | Yellow[b] | Gamut |
| 1 | 1 | A | 0.2 | 1.21 | 0.73 | 0.87 | 0.96 | 5367 |
| 2[a] | 1 | B | 0.2 | 1.20 | 0.76 | 0.88 | 0.94 | 5295 |
| 3[c] | 1.2 | — | — | 1.15 | 0.74 | 0.85 | 0.87 | 5123 |
| 4 | 1 | A | 0.4 | 1.27 | 0.74 | 0.88 | 1.06 | 5667 |
| 5[c] | 1 | B | 0.4 | 1.25 | 0.74 | 0.87 | 1.00 | 5315 |
| 6[c] | 1.4 | — | — | 1.16 | 0.74 | 0.85 | 0.87 | 5147 |

[a]dosage units are dry weight % based on the weight of dry paper;
[b]pigmented ink;
[c]comparative examples Print characteristics results-Canon Pixma MP980 inkjet printer

| | Starch | | Polymer | Optical Density | | | | |
|---|---|---|---|---|---|---|---|---|
| Sample | Dosage[a] | Polymer | Dosage[a] | Black[b] | Cyan[c] | Magenta[c] | Yellow[c] | Gamut |
| 1 | 1 | A | 0.2 | 1.69 | 1.24 | 1.31 | 1.30 | 7036 |
| 2[d] | 1 | B | 0.2 | 1.63 | 1.27 | 1.35 | 1.35 | 7212 |
| 3[d] | 1.2 | — | — | 1.55 | 1.18 | 1.20 | 1.20 | 6596 |
| 4 | 1 | A | 0.4 | 1.70 | 1.24 | 1.36 | 1.34 | 7283 |
| 5[d] | 1 | B | 0.4 | 1.69 | 1.26 | 1.39 | 1.40 | 7374 |
| 6[d] | 1.4 | — | — | 1.56 | 1.19 | 1.20 | 1.21 | 6625 |

[a]dosage units are dry weight % based on the weight of dry paper;
[b]pigmented ink;
[c]dye ink;
[d]comparative examples

TABLE 7

| Water-fastness results-Canon Pixma MP980 inkjet printer | | | | | | |
|---|---|---|---|---|---|---|
| Sample | Starch Dosage[a] | Polymer | Polymer Dosage[a] | Cyan[b] | Magenta[b] | Yellow[b] |
| 1 | 1 | A | 0.2 | 78.2 | 46.2 | 64.5 |
| 2[c] | 1 | B | 0.2 | 71.0 | 46.5 | 59.7 |
| 3[c] | 1.2 | — | — | 42.36 | 35.9 | 48.4 |
| 4 | 1 | A | 0.4 | 96.43 | 54.2 | 74.4 |
| 5[c] | 1 | B | 0.4 | 88.85 | 51.1 | 67.8 |
| 6[c] | 1.4 | — | — | 42.66 | 37.0 | 49.5 |

[a]dosage units are dry weight % based on the weight of dry paper;
[b]dye ink;
[c]comparative examples Example 5: In this example, Polymer E, a hydrophilic cationic dispersion polymer with formula, poly-(DADMAC/AcAm), 30/70 DADMAC/AcAm mole ratio and RSV of about 4 dL/g, was compared to Polymer F, a polymer with the same DADMAC/AcAm mole ratio and RSV, but produced in latex form. As shown in Table 8, the viscosity of a 7% starch solution (7 g of dry starch in total 100 g of water/starch) was increased slightly when Polymer E was added to it at a concentration of 0.5% (0.5 g of dry polymer in 100 g of mixture), but still within the range of applicability for size press operations. On the contrary, a high viscosity solution, that could not be used in practice, was formed when latex Polymer F, which has the same RSV and molecular weight as Polymer E, was added to a 7% starch solution.

The Brookfield viscosity of starch at 10% (10 g of dry starch in total 100 g of water/starch), and that of starch co-mixed with Polymer D of the invention are also given in Table 8 for comparison. Polymer D, a poly-(DADMAC/AcAm) polymer with 40/60 DADMAC/AcAm mole ratio and RSV of 0.7 dL/g, did not change within experimental error the viscosity of the aqueous starch solution.

TABLE 8

| Brookfield Viscosities[a] | | | | | |
|---|---|---|---|---|---|
| Polymer | Polymer, wt % | Starch, % | Viscosity, Cp | T, ° C. | rpm |
| D | 0.5 | 7 | 48.6 | 60 | 100 |
| E | 0.5 | 7 | 84.0 | 60 | 100 |
| F[b] | 0.5 | 7 | 849.6 | 60 | 25 |
| —[b] | — | 7 | 42.6 | 60 | 100 |
| —[b] | — | 10 | 107.1 | 60 | 100 |

[a]measured with LV-2 (62) spindle;
[b]comparative examples

The paper utilized for surface treatment was a woodfree base paper of basis weight of about 69 g/m$^2$, produced on a paper machine without size press additives. As shown in Table 9, polymer E improved water fastness compared to latex polymer F. The two polymers have an identical cationic monomer/AcAm mole ratio, but the measured charge density, determined by colloid titration, of Polymer E (3.4 meq/g) was higher than that of Polymer F (2.5 meq/g), indicating that Polymer E has a higher number of cationic groups available for interaction with the anionic dye.

TABLE 9

| Water-fastness results-Canon Pixma MP980 inkjet printer | | | | | | |
|---|---|---|---|---|---|---|
| Sample | Starch Dosage[a] | Polymer | Polymer Dosage[a] | Cyan[b] | Magenta[b] | Yellow[b] |
| 1 | 1 | E | 0.2 | 88.2 | 55.8 | 70.0 |
| 2[c] | 1 | F | 0.2 | 80.7 | 52.6 | 63.4 |
| 4 | 1 | E | 0.4 | 99.0 | 65.0 | 79.8 |
| 5[c] | 1 | F | 0.4 | 93.8 | 61.0 | 71.2 |

[a]dosage units are dry weight % based on the weight of dry paper;
[b]dye ink;
[c]comparative examples Example 6: In this example the ink jet performance of paper treated with Polymer E of the invention co-mixed with starch was compared to that of paper treated with starch only and paper treated with starch co-mixed with comparative polymer G (poly-(DMAEA.BCQ/AcAm) polymer with 50/50 DMAEA.BCQ/AcAm mole ratio.

The paper utilized for surface treatment was a woodfree base paper of basis weight of about 69 g/m$^2$, produced on a paper machine without size press additives. As shown in Table 10, Polymer E of the invention when co-mixed with starch improved significantly the optical density of all four colors and gamut for prints produced with pigmented inks compared to polymer G co-mixed with starch or starch by itself. Polymer E also produced sharper details, as shown by the lowest values of K on Y (Black on Yellow) bleed achieved for paper treated with this polymer.

Similar ink jet performance benefits were observed for prints obtained with dye-based inks (Table 11).

TABLE 10

| Print characteristics results-HP Photosmart Pro B9180 inkjet printer | | | | | | | | | |
|---|---|---|---|---|---|---|---|---|---|
| | Starch | | Polymer | Optical Density | | | | | K on Y |
| Sample | Dosage[a] | Polymer | Dosage[a] | Black[b] | Cyan[b] | Magenta[b] | Yellow[b] | Gamut | Bleed[c] |
| 1 | 1 | E | 0.2 | 1.30 | 0.74 | 0.88 | 0.97 | 5583 | 17 |
| 2[d] | 1 | G | 0.2 | 1.24 | 0.73 | 0.84 | 0.92 | 5349 | 31.5 |
| 3[d] | 1.2 | — | — | 1.21 | 0.74 | 0.84 | 0.87 | 5135 | 20.4 |
| 4 | 1 | E | 0.4 | 1.34 | 0.74 | 0.88 | 1.04 | 5818 | 14.6 |
| 5[d] | 1 | G | 0.4 | 1.27 | 0.73 | 0.86 | 1.02 | 5349 | 20 |
| 6[d] | 1.4 | — | — | 1.21 | 0.74 | 0.84 | 0.86 | 5139 | 16.2 |

[a]dosage units are dry weight % based on the weight of dry paper;
[b]pigmented ink;
[c]unit, micrometers;
[d]comparative examples

TABLE 11

| Print characteristics results-Canon Pixma MP980 inkjet printer | | | | | | | | |
|---|---|---|---|---|---|---|---|---|
| | Starch | | Polymer | Optical Density | | | | |
| Sample | Dosage[a] | Polymer | Dosage[a] | Black[b] | Cyan[c] | Magenta[c] | Yellow[c] | Gamut |
| 1 | 1 | E | 0.2 | 1.46 | 1.22 | 1.26 | 1.26 | 6880 |
| 2[d] | 1 | G | 0.2 | 1.42 | 1.21 | 1.22 | 1.22 | 6743 |
| 3[d] | 1.2 | — | — | 1.41 | 1.17 | 1.19 | 1.19 | 6530 |
| 4 | 1 | E | 0.4 | 1.51 | 1.22 | 1.29 | 1.28 | 6989 |
| 5[d] | 1 | G | 0.4 | 1.44 | 1.21 | 1.24 | 1.23 | 6705 |
| 6[d] | 1.4 | — | — | 1.43 | 1.17 | 1.20 | 1.20 | 6586 |

[a]dosage units are dry weight % based on the weight of dry paper;
[b]pigmented ink;
[c]dye ink;
[d]comparative examples As shown in Table 12, Polymer E provided the best water fastness results. The charge density of polymer E and G expressed in meq/g of polymer should be similar based on their respective cationic monomer mole %. However, when measured by colloid titration the charge density of polymer E (3.4 meq/g) was higher than that of polymer G (2.7 meq/g), indicating that polymer E has a higher number of cationic monomers available for interaction with the ink than polymer G.

TABLE 12

| Water-fastness results-Canon Pixma MP980 inkjet printer | | | | | | |
|---|---|---|---|---|---|---|
| Sample | Starch Dosage[a] | Polymer | Polymer Dosage[a] | Cyan[b] | Magenta[b] | Yellow[b] |
| 1 | 1 | E | 0.2 | 88.2 | 55.8 | 70.0 |
| 2[c] | 1 | G | 0.2 | 81.0 | 55.0 | 65.4 |
| 3[c] | 1.2 | — | — | 42.6 | 36.9 | 49.8 |
| 4 | 1 | E | 0.4 | 99.0 | 65.0 | 79.8 |
| 5[c] | 1 | G | 0.4 | 90.0 | 60.5 | 73.2 |
| 6[c] | 1.4 | — | — | 42.6 | 36.5 | 49.7 |

[a]dosage units are dry weight % based on the weight of dry paper;
[b]dye ink;
[c]comparative examples Example 7: As shown in Table 13, the inkjet performance of paper produced with Polymer D or Polymer E individually mixed with starch was compared to that of paper produced with mixtures of starch and solution polymers H or I and starch by itself. Polymer H is a poly-(EPI-DMA) solution polymer and Polymer I is a poly-DADMAC solution polymer.

The paper utilized for surface treatment was a woodfree base paper of basis weight of about 69 g/$m^2$, produced on a paper machine without size press additives. As shown in Table 13, Polymer D and Polymer E when mixed with starch significantly improved optical density of all four colors and gamut for prints produced with pigmented inks compared to Polymer H or Polymer I mixed with starch or starch by itself.

For prints with dye-based inks (Table 14), the best results were obtained with polymer E co-mixed with starch that outperformed not only starch by itself, but also solution polymer H, while it gave results similar to solution polymer I.

TABLE 13

| Print characteristics results-HP Photosmart Pro B9180 inkjet printer | | | | | | | | |
|---|---|---|---|---|---|---|---|---|
| | Starch | | Polymer | Optical Density | | | | |
| Sample | Dosage[a] | Polymer | Dosage[a] | Black[b] | Cyan[b] | Magenta[b] | Yellow[b] | Gamut |
| 1 | 1 | D | 0.2 | 1.52 | 0.73 | 0.85 | 1.04 | 5785 |
| 2 | 1 | E | 0.2 | 1.54 | 0.74 | 0.87 | 1.05 | 5835 |
| 3 | 1 | D | 0.4 | 1.58 | 0.74 | 0.87 | 1.12 | 6060 |
| 4 | 1 | E | 0.4 | 1.59 | 0.74 | 0.88 | 1.12 | 6032 |
| 5[c] | 1.2 | — | — | 1.43 | 0.74 | 0.83 | 0.93 | 5288 |
| 6[c] | 1.4 | — | — | 1.44 | 0.74 | 0.83 | 0.94 | 5271 |
| 7[c] | 1 | H | 0.2 | 1.45 | 0.73 | 0.83 | 0.95 | 5416 |
| 8[c] | 1 | I | 0.2 | 1.44 | 0.74 | 0.84 | 0.97 | 5598 |

[a]dosage units are dry weight % based on the weight of dry paper;
[b]pigmented ink;
[c]comparative examples

TABLE 14

Print characteristics results-Canon Pixma MP980 inkjet printer

| Sample | Starch Dosage[a] | Polymer | Polymer Dosage[a] | Optical Density Black[b] | Cyan[c] | Magenta[c] | Yellow[c] | Gamut |
|---|---|---|---|---|---|---|---|---|
| 1 | 1 | D | 0.2 | 1.52 | 1.19 | 1.19 | 1.20 | 6489 |
| 2 | 1 | E | 0.2 | 1.53 | 1.22 | 1.22 | 1.23 | 6665 |
| 3 | 1 | D | 0.4 | 1.53 | 1.19 | 1.21 | 1.21 | 6602 |
| 4 | 1 | E | 0.4 | 1.57 | 1.22 | 1.26 | 1.27 | 6816 |
| 5[d] | 1.2 | — | — | 1.47 | 1.16 | 1.16 | 1.18 | 6370 |
| 6[d] | 1.4 | — | — | 1.45 | 1.16 | 1.18 | 1.19 | 6455 |
| 7[d] | 1 | H | 0.2 | 1.50 | 1.20 | 1.18 | 1.19 | 6562 |
| 8[d] | 1 | 1 | 0.2 | 1.50 | 1.22 | 1.18 | 1.23 | 6639 |

[a]dosage units are dry weight % based on the weight of dry paper;
[b]pigmented ink;
[c]dye ink;
[d]comparative examples Solution polymers H and I contain 100% cationic monomer and their charge density measured by colloid titration was very high (6.8 meq/g for Polymer H, and 6 meq/g for Polymer I). Surprisingly, it was found that for the same level of meq of cationic charge added to paper (calculated based on the measured charge density of the polymer and the total amount of polymer used to treat the surface of paper), Polymer D and Polymer E outperformed solution Polymer H and Polymer I in term of water fastness. Therefore, less cationic charge in meq was needed to treat the surface of paper to achieve the same level of water fastness when using Polymer D or Polymer E compared to Polymer H or Polymer I.

Figure 2:
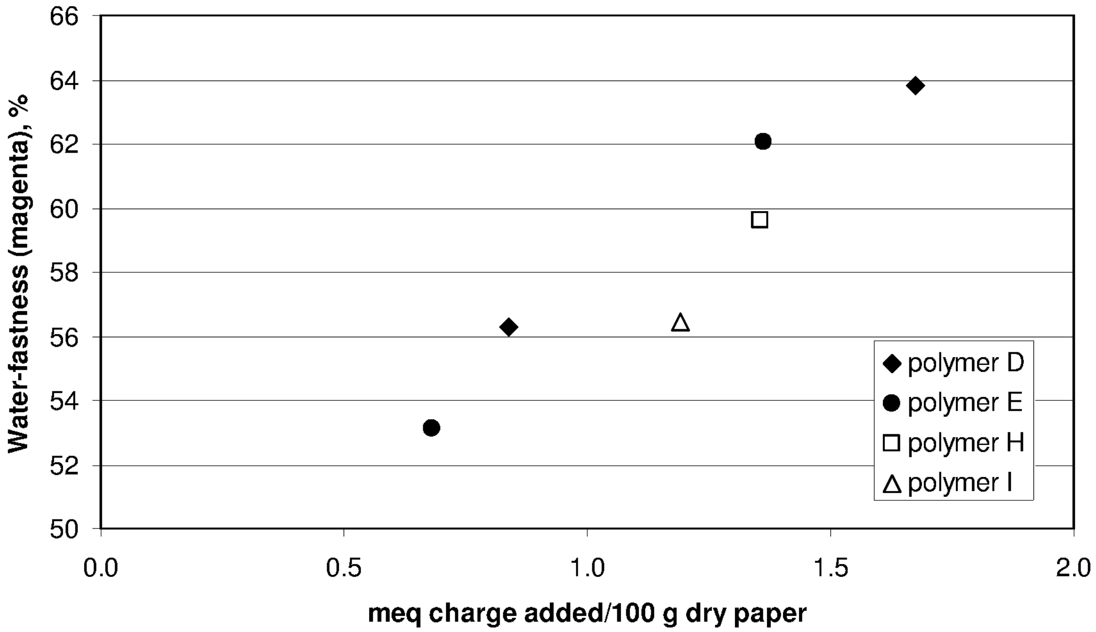
FIG. 2 is a graph of water fastness of magenta prints obtained with dye-based inks on a paper surface treated with polymers from Example 7 plotted versus an amount of polymer charge of the respective polymer added per square meter of dry paper.

FIG. 2 gives the trends of water fastness (magenta water fastness as representative example) versus cationic charge added using polymer D, Polymer E, Polymer H and Polymer I. The trends obtained illustrate the benefits obtained by using Polymer D or Polymer E of the invention. Similar trends were obtained for cyan and yellow water fastness.

Example 8: In this example, 0.5 and 1 weight % aqueous solutions of polymer only were used to treat the surface of commercial multi-purpose copy paper, Navigator™, with nominal basis weight of 80 g/m$^2$.

TABLE 15

Print characteristics results-Canon Pixma MP980 inkjet printer

| Sample | Polymer | Polymer Dosage[a] | Optical Density Black[b] | Cyan[c] | Magenta[c] | Yellow[c] | Gamut |
|---|---|---|---|---|---|---|---|
| 1 | D | 0.3 | 1.94 | 1.17 | 1.33 | 1.39 | 7254 |
| 2 | E | 0.3 | 2.08 | 1.17 | 1.40 | 1.47 | 7324 |
| 3[d] | G | 0.3 | 1.93 | 1.18 | 1.34 | 1.39 | 7210 |
| 4[d] | H | 0.3 | 1.91 | 1.12 | 1.28 | 1.36 | 7061 |
| 5[d] | I | 0.3 | 1.95 | 1.15 | 1.32 | 1.45 | 7215 |
| Copy Paper[d] | — | — | 1.87 | 1.11 | 1.21 | 1.28 | 6629 |

Figure 3:
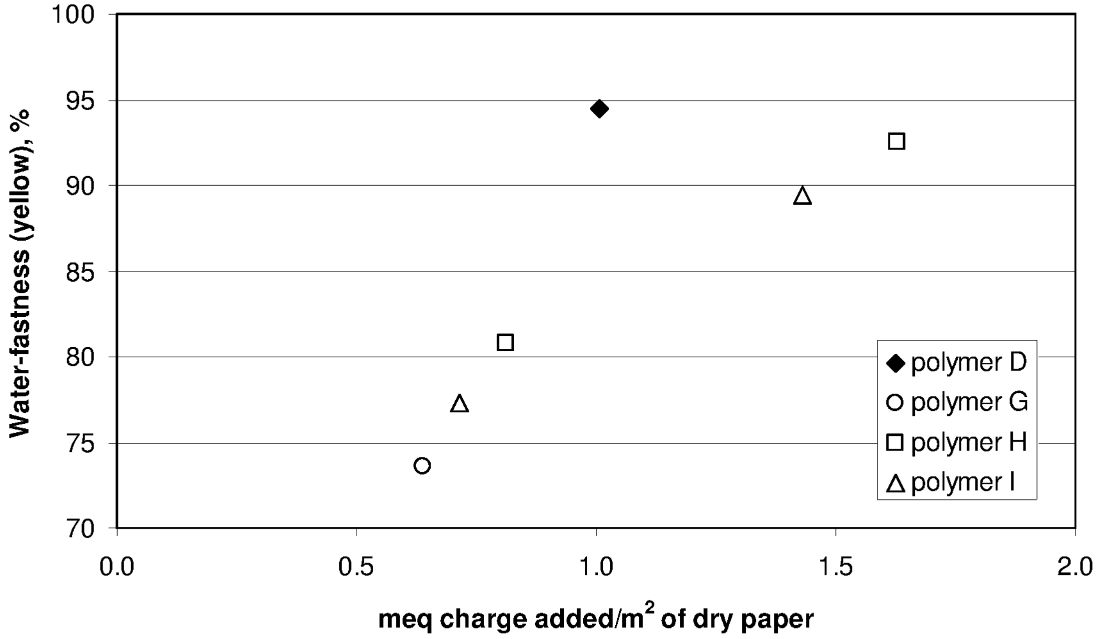
FIG. 3 is a graph of water fastness of yellow prints obtained with dye-based inks on a paper surface treated with polymers from Example 8 plotted versus an amount of polymer charge of the respective polymer added per square meter of dry paper.

[a]dosage units are dry weight % based on the weight of dry paper;
[b]pigmented ink;
[c]dye ink
[d]comparative examples The inkjet printing results obtained with dye-based inks are given in Table 15 for polymer dosages of about 0.3 weight % (based on a dry weight of the paper). For the determination of water fastness, polymers H and I were added at dosages of about 0.15 and about 0.3 weight % (based on a dry weight of the paper), whereas polymers D, and G were added at a dosage of about 0.3 weight %. In FIG. 3, yellow water fastness is plotted vs. the amount of total charge added to paper based on the polymer type. Similar trends were obtained for cyan and magenta water fastness. FIG. 3 shows that water fastness of prints on paper surface-treated with polymer D was higher than for paper treated with hydrophobic dispersion polymer G. FIG. 3 also illustrates that for the same level of charge added to treat the paper substrate, Polymer D outperformed solution Polymer H and Polymer I in terms of water fastness. Therefore, less charge was needed to achieve the same level of water fastness when using Polymer D compare to Polymer H or Polymer I. These results show that the water fastness benefits obtained with a mixture of starch and hydrophilic cationic dispersion polymer (Example 7) are maintained in absence of starch. The benefits of water fastness observed with the hydrophilic cationic dispersion polymers are intrinsic to the presence of the hydrophilic cationic dispersion polymer in the composition and not dependent on starch or other additives in the composition.

Example 9: In this example the inkjet performance of Polymer L of the invention containing 19 mole % of hydrophilic cationic monomer, DMAEA.MCQ, 17 mole % of hydrophobic cationic monomer, DMAEA.BCQ, and 64 mole % of nonionic monomer, AcAm, was compared to that of polymer G containing 50 mole % of hydrophobic monomer, DMAEA.BCQ, and 50 mole % of nonionic monomer, AcAm. The paper utilized for surface treatment was a woodfree base paper of basis weight of about 69 g/$m^2$, produced on a paper machine without size press additives. As shown in Table 16, Polymer L when co-mixed with starch improved optical density of all four colors and gamut for prints produced with pigmented inks compared to polymer G co-mixed with starch or starch by itself. Similar ink jet performance benefits were observed for prints obtained with dye-based inks (Table 17). As shown in Table 18, Polymer L improved water fastness compared to Polymer G or starch by itself. The measured charge density, determined by colloidal titration, of Polymer L (3.2 meq/g) was higher than that of Polymer G (2.7 meq/g). The higher measured charge density of polymer L is the result of its hydrophilicity that promotes the solubility of Polymer L with higher number of cationic monomers available for interaction of the ink. On the contrary, the hydrophobicity of polymer G impairs its solubility and decreases the number of cationic monomers available for interaction with the ink.

TABLE 16

Print characteristics results-HP Pholosmart Pro B9180 inkjet printer

| Sample | Starch Dosage[a] | Polymer | Polymer Dosage[a] | Optical Density Black[b] | Cyan[b] | Magenta[b] | Yellow[b] | Gamut |
|---|---|---|---|---|---|---|---|---|
| 1 | 1 | L | 0.2 | 1.46 | 0.74 | 0.84 | 1.46 | 5749 |
| 2[d] | 1 | G | 0.2 | 1.44 | 0.73 | 0.83 | 1.44 | 5612 |
| 3[d] | 1.2 | — | — | 1.41 | 0.74 | 0.83 | 0.95 | 5512 |
| 4 | 1 | L | 0.4 | 1.51 | 0.73 | 0.84 | 1.08 | 5991 |
| 5[d] | 1 | G | 0.4 | 1.50 | 0.73 | 0.83 | 1.04 | 5881 |
| 6[d] | 1.4 | — | — | 1.43 | 0.74 | 0.82 | 0.96 | 5547 |

[a]dosage units are dry weight % based on the weight of dry paper;
[b]pigmented ink;
[c]unit, micrometers;
[d]comparative examples

TABLE 17

Print characteristics results-Canon Pixma MP980 inkjet printer

| Sample | Starch Dosage[a] | Polymer | Polymer Dosage[a] | Optical Density Black[b] | Cyan[c] | Magenta[c] | Yellow[c] | Gamut |
|---|---|---|---|---|---|---|---|---|
| 1 | 1 | L | 0.2 | 1.65 | 1.21 | 1.17 | 1.18 | 7468 |
| 2[d] | 1 | G | 0.2 | 1.64 | 1.20 | 1.17 | 1.17 | 7479 |
| 3[d] | 1.2 | — | — | 1.62 | 1.15 | 1.12 | 1.14 | 7302 |
| 4 | 1 | L | 0.4 | 1.68 | 1.21 | 1.18 | 1.19 | 7501 |
| 5[d] | 1 | G | 0.4 | 1.68 | 1.21 | 1.18 | 1.18 | 7468 |
| 6[d] | 1.4 | — | — | 1.63 | 1.16 | 1.16 | 1.17 | 7385 |

[a]dosage units are dry weight % based on the weight of dry paper;
[b]pigmented ink;
[c]dye ink;
[d]comparative examples

TABLE 18

| Water-fastness results-Canon Pixma MP980 inkjet printer | | | | | | |
|---|---|---|---|---|---|---|
| Sample | Starch Dosage[a] | Polymer | Polymer Dosage[a] | Cyan[b] | Magenta[b] | Yellow[b] |
| 1 | 1 | L | 0.2 | 78.2 | 52.5 | 77.0 |
| 2[c] | 1 | G | 0.2 | 74.4 | 52.7 | 72.6 |
| 3[c] | 1.2 | — | — | 45.5 | 37.5 | 60.2 |
| 4 | 1 | L | 0.4 | 90.7 | 58.7 | 86.7 |
| 5[c] | 1 | G | 0.4 | 87.6 | 58.8 | 84.1 |
| 6[c] | 1.4 | — | — | 44.1 | 37.2 | 57.8 |

[a]dosage units are dry weight % based on the weight of dry paper;
[b]dye ink;
[c]comparative examples Embodiments of the present disclosure further relate to any one or more of the following paragraphs:

1. A composition, comprising: a hydrophilic cationic dispersion polymer disposed on a surface of a substrate, wherein the substrate is selected from the group consisting of: a paper, a textile, a non-woven material, a film and mixtures thereof, and the hydrophilic cationic dispersion polymer comprises repeating units derived from a first monomer and a second monomer, wherein: the first monomer is a nonionic monomer; and the second monomer is at least one hydrophilic cationic monomer selected from the group consisting of a diallyl-N,N-dimethylammonium halide and a third monomer of the formula I:

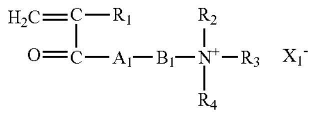
I wherein $A_1$ is O or NH; $B_1$ is a $C_2$-$C_4$ alkylene or hydroxypropylene; $R_1$ is H or $CH_3$; $R_2$ and $R_4$ are independently a $C_1$-$C_2$ alkyl; $R_3$ is H or a $C_1$-$C_2$ alkyl; and $X_1$ is an anionic counterion.

2. The composition of paragraph 1, wherein the substrate is a paper.

3. The composition of paragraph 1 or 2, wherein the first monomer is selected from the group consisting of acrylamide, methacrylamide, N-methylacrylamide, N,N-dimethyl (meth)acrylamide, N-isopropyl(meth)acrylamide, N-(2-hydroxypropyl)methacrylamide, N-methylolacrylamide, N-vinylformamide, N-vinylacetamide, N-vinyl-N-methylacetamide, poly(ethylene glycol)(meth)acrylate, poly(ethylene glycol) monomethyl ether mono(meth)acryate, N-vinyl-2-pyrrolidone, glycerol mono((meth)acrylate), 2-hydroxyethyl(meth)acrylate, vinyl methylsulfone, and vinyl acetate.

4. The composition of paragraph 1 or 2, wherein the first monomer is acrylamide or methacrylamide.

5. The composition of any of paragraphs 1 to 4, wherein $X_1$ is selected from the group consisting of: a halide ion, a sulfate ion, a phosphate ion, a monohydrogen phosphate ion, and a nitrate ion.

6. The composition of any of paragraphs 1 to 5, wherein the second monomer comprises diallyl-N,N-dimethylammonium chloride.

7. The composition of any of paragraphs 1 to 5, wherein the second monomer comprises dimethylaminoethyl acrylate methyl chloride salt.

8. The composition of any of paragraphs 1 to 7, further comprising a starch disposed on the surface of the substrate.

9. The composition of paragraph 8, wherein the starch is selected from the group consisting of: cationic starch, nonionic starch, anionic starch, and a mixture thereof.

10. The composition of paragraph 8 or paragraph 9, wherein the starch is ethylated starch.

11. The composition of any of paragraphs 1 to 10, further comprising a sizing agent disposed on the surface of the substrate.

12. The composition of paragraph 11, wherein the sizing agent is selected from the group consisting of: rosin-based products, an alkenyl succinic anhydride, an alkyl ketene dimer, a styrene-maleic anhydride copolymer, a styrene-acrylate copolymer, a polyurethane, and a mixture thereof.

13. The composition of any of paragraphs 1 to 12, wherein the composition comprises about 0.02 weight % to about 0.7 weight % of the hydrophilic cationic dispersion polymer, based on a dry weight of the substrate.

14. The composition of paragraph 13, wherein the composition comprises about 0.1 weight % to about 0.5 weight % of the hydrophilic cationic dispersion polymer, based on a dry weight of the substrate.

15. The composition of any of paragraphs 1 to 14, wherein the hydrophilic cationic dispersion polymer comprises about 20 mole % to about 95 mole % of repeating units derived from the nonionic monomer.

16. The composition of any of paragraphs 1 to 15, wherein the hydrophilic cationic dispersion polymer comprises about 5 mole % to about 80 mole % of repeating units derived from the hydrophilic cationic monomer.

17. The composition of any of paragraphs 1 to 16, wherein the hydrophilic cationic dispersion polymer further comprises repeating units derived from a hydrophobic cationic monomer.

18. The composition of paragraph 17, wherein the hydrophobic cationic monomer has the formula II:

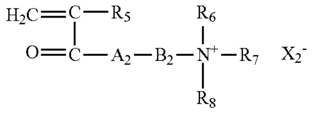
II wherein $A_2$ is O or NH; $B_2$ is a $C_2$-$C_4$ alkylene or hydroxypropylene; $R_5$ is H or $CH_3$; $R_6$ and $R_8$ are independently a $C_1$-$C_2$ alkyl; $R_7$ is a $C_6$-$C_{20}$ alkyl or a $C_6$-$C_{20}$ arylalkyl; and $X_2$ is an anionic counterion.

19. The composition of paragraph 18, wherein X2 is selected from the group consisting of: a halide ion, a sulfate ion, a phosphate ion, a monohydrogen phosphate ion, and a nitrate ion.

20. The composition of paragraph 19, wherein the hydrophobic cationic monomer is dimethylaminoethylacrylate benzyl chloride salt.

21. The composition of any of paragraphs 17 to 20, wherein the hydrophilic cationic dispersion polymer comprises from 0 mole % to about 40 mole % of repeating units derived from the hydrophobic cationic monomer.

22. The composition of any of paragraphs 1 to 21, further comprising an ink.

23. The composition of paragraph 22, wherein the ink is a pigmented ink.

24. The composition of paragraph 22 or paragraph 23, wherein the ink is a dye-based ink.

25. A method of treating a substrate surface, comprising: applying an aqueous solution comprising a hydrophilic cationic dispersion polymer to a surface of a substrate, wherein the hydrophilic cationic dispersion polymer comprises repeating units derived from a first monomer and a second monomer, wherein: the first monomer comprises a nonionic monomer; and the second monomer is at least one hydrophilic cationic monomer selected from the group consisting of: a diallyl-N,N-dimethylammonium halide and a third monomer of the formula I:

I

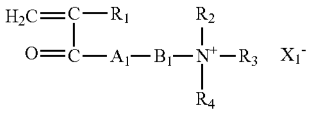

wherein $A_1$ is O or NH; $B_1$ is a $C_2$-$C_4$ alkylene or hydroxypropylene; $R_1$ is H or $CH_3$; $R_2$ and $R_4$ are independently a $C_1$-$C_2$ alkyl; $R_3$ is H or a $C_1$-$C_2$ alkyl; and $X_1$ is an anionic counterion.

26. The method of paragraph 25, wherein the first monomer is acrylamide or methacrylamide.

27. The method of paragraph 25 or paragraph 26, wherein the second monomer comprises diallyl-N,N-dimethylammonium chloride.

28. The method of paragraph 25 or paragraph 26, wherein the second monomer comprises dimethylaminoethyl acrylate methyl chloride salt.

29. The method of any of paragraphs 25 to 28, further comprising mixing a starch into the aqueous solution prior to applying the aqueous solution to the surface of the substrate.

30. The method of any of paragraphs 25 to 29, further comprising mixing a sizing agent into the aqueous solution prior to applying the aqueous solution to the surface of the substrate.

31. The method of any of paragraphs 25 to 30, wherein the aqueous solution is applied to the surface of the substrate in a size press.

32. The method of any of paragraphs 25 to 30, wherein the aqueous solution is applied to the surface of the substrate in a printing device.

33. The method of paragraph 32, further comprising printing an ink on the surface of the substrate in the printing device after the aqueous solution is applied to the surface of the substrate.

34. The method of any of paragraphs 25 to 30, wherein the aqueous solution is applied to the surface of the substrate in a coating device.

35. The method of any of paragraphs 25 to 34, wherein the hydrophilic cationic dispersion polymer comprises about 20 mole % to about 95 mole % of repeating units derived from the nonionic monomer.

36. The method of any of paragraphs 25 to 35, wherein the hydrophilic cationic dispersion polymer comprises about 5 mole % to about 80 mole % of repeating units derived from the hydrophilic cationic monomer.

37. The method of any of paragraphs 25 to 36, wherein the hydrophilic cationic dispersion polymer further comprises repeating units derived from a hydrophobic cationic monomer.

38. The method of paragraph 37, wherein the hydrophobic cationic monomer has the formula II:

II

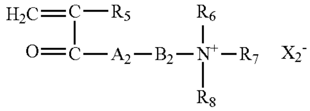

wherein $A_2$ is O or NH; $B_2$ is a $C_2$-$C_4$ alkylene or hydroxypropylene; $R_5$ is H or $CH_3$; $R_6$ and $R_8$ are independently a $C_1$-$C_2$ alkyl; $R_7$ is a $C_6$-$C_{20}$ alkyl or a $C_6$-$C_{20}$ arylalkyl; and $X_2$ is an anionic counterion.

39. The method of paragraph 38, wherein the hydrophobic cationic monomer is dimethylaminoethylacrylate benzyl chloride salt.

40. The method of any of paragraphs 37 to 39, wherein the hydrophilic cationic dispersion polymer comprises from 0 mole % to about 40 mole % of repeating units derived from the hydrophobic cationic monomer.

41. A paper composition, comprising: a paper substrate; starch; a sizing agent; and 0.02 to 0.7 weight % of a hydrophilic cationic dispersion polymer based on a dry weight of the paper substrate, wherein the hydrophilic cationic dispersion polymer comprises repeating units derived from a first monomer and a second monomer, wherein: the first monomer is acrylamide or methacrylamide, and the second monomer is at least one hydrophilic cationic monomer selected from the group consisting of: a diallyl-N,N-dimethylammonium halide and a monomer of the formula I:

I

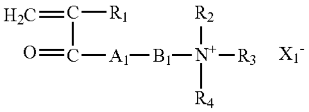

wherein $A_1$ is O or NH; $B_1$ is a $C_2$-$C_4$ alkylene or hydroxypropylene; $R_1$ is H or $CH_3$; $R_2$ and $R_4$ are independently a $C_1$-$C_2$ alkyl; $R_3$ is H or a $C_1$-$C_2$ alkyl; and $X_1$ is an anionic counterion selected from the group consisting of: a halide ion, a sulfate ion, a phosphate ion, a monohydrogen phosphate ion, and a nitrate ion.

42. The paper composition of paragraph 41, further comprising an ink.

43. The paper composition of paragraph 42, wherein the ink is a pigmented ink.

44. The paper composition of paragraph 42 or 43, wherein the ink is a dye-based ink.

45. The paper composition of any of paragraphs 42 to 44, wherein the ink is disposed on a surface of the paper composition.

46. The paper composition of any of paragraphs 41 to 44, wherein the starch is disposed on a surface of the paper substrate.

47. The paper composition of any of paragraphs 41 to 44, wherein the sizing agent is disposed on a surface of the paper substrate.

48. The paper composition of any of paragraphs 41 to 44, wherein the hydrophilic cationic dispersion polymer is disposed on a surface of the paper substrate.

49. The paper composition of any of paragraphs 41 to 44, wherein the starch, the sizing agent, and the hydrophilic cationic dispersion polymer are disposed on a surface of the paper substrate.

50. The paper composition of any of paragraphs 41 to 44, wherein a mixture comprising at least two of: the starch, the sizing agent, and the hydrophilic cationic dispersion polymer is disposed on a surface of the paper substrate.

51. The paper composition of any of paragraphs 46 to 50, further comprising an ink disposed on the surface of the paper composition.

52. The paper composition of paragraph 51, wherein the ink is a pigmented ink.

53. The paper composition of paragraph 51 or 52, wherein the ink is a dye-based ink.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim can be not defined above, it should be given the broadest definition persons in the pertinent art have given that term as reflected in at least one printed publication or issued patent. Furthermore, all patents, test procedures, and other documents cited in this application are fully incorporated by reference to the extent such disclosure can be not inconsistent with this application and for all jurisdictions in which such incorporation can be permitted.

While the foregoing can be directed to embodiments of the present invention, other and further embodiments of the invention may be devised without departing from the basic scope thereof, and the scope thereof can be determined by the claims that follow.

What is claimed is:

1. A composition, comprising:

a hydrophilic cationic dispersion polymer, a starch, and an ink disposed on a surface of a substrate, wherein the substrate is selected from the group consisting of: a paper, a textile, a non-woven material, a film and mixtures thereof, wherein the hydrophilic cationic dispersion polymer comprises repeating units derived from a first monomer and a second monomer, wherein:

the first monomer is a nonionic monomer, the second monomer is at least one hydrophilic cationic monomer selected from the group consisting of: a diallyl-N,N-dimethylammonium halide and a monomer of the formula I:

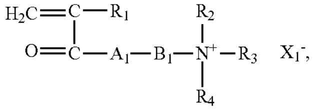

I wherein $A_1$ is O or NH; $B_1$ is a $C_2$-$C_4$ alkylene or hydroxypropylene; $R_1$ is H or $CH_3$; $R_2$ and $R_4$ are independently a $C_1$-$C_2$ alkyl; $R_3$ is H or a $C_1$-$C_2$ alkyl; and $X_1$ is an anionic counterion, and the hydrophilic cationic dispersion polymer contains a higher mole % of repeating units derived from hydrophilic cationic monomers than hydrophobic cationic monomers.

2. The composition of claim 1, wherein the substrate is a paper.

3. The composition of claim 1, wherein the first monomer is selected from the group consisting of: acrylamide, methacrylamide, N-methylacrylamide, N,N-dimethyl(meth)acrylamide, N-isopropyl(meth)acrylamide, N-(2-hydroxypropyl)methacrylamide, N-methylolacrylamide, N-vinylformamide, N-vinylacetamide, N-vinyl-N-methylacetamide, poly(ethylene glycol)(meth)acrylate, poly(ethylene glycol) monomethyl ether mono(meth)acryate, N-vinyl-2-pyrrolidone, glycerol mono((meth)acrylate), 2-hydroxyethyl(meth)acrylate, vinyl methylsulfone, and vinyl acetate.

4. The composition of claim 1, wherein $X_1$ is selected from the group consisting of: a halide ion, a sulfate ion, a phosphate ion, a monohydrogen phosphate ion, and a nitrate ion.

5. The composition of claim 1, wherein the second monomer comprises diallyl-N,N-dimethylammonium chloride, dimethylaminoethyl acrylate methyl chloride salt, or a mixture thereof.

6. The composition of claim 1, wherein the starch is selected from the group consisting of: a cationic starch, a nonionic starch, an anionic starch, and a mixture thereof.

7. The composition of claim 1, further comprising a sizing agent disposed on the surface of the substrate.

8. The composition of claim 1, wherein the composition comprises about 0.02 weight % to about 0.7 weight % of the hydrophilic cationic dispersion polymer, based on a dry weight of the substrate.

9. The composition of claim 1, wherein the hydrophilic cationic dispersion polymer comprises about 20 mole % to about 95 mole % of repeating units derived from the nonionic monomer.

10. The composition of claim 1, wherein the hydrophilic cationic dispersion polymer further comprises repeating units derived from a hydrophobic cationic monomer.

11. The composition of claim 10, wherein the hydrophobic cationic monomer has the formula II:

II

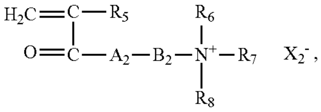

wherein $A_2$ is O or NH; $B_2$ is a $C_2$-$C_4$ alkylene or hydroxypropylene; $R_5$ is H or $CH_3$; $R_6$ and $R_8$ are independently a $C_1$-$C_2$ alkyl; $R_7$ is a $C_6$-$C_{20}$ alkyl or a $C_6$-$C_{20}$ arylalkyl; and $X_2$ is an anionic counterion.

12. The composition of claim 11, wherein $X_2$ is selected from the group consisting of: a halide ion, a sulfate ion, a phosphate ion, a monohydrogen phosphate ion, and a nitrate ion.

13. The composition of claim 11, wherein the hydrophobic cationic monomer is dimethylaminoethylacrylate benzyl chloride salt.

14. A method of treating a substrate surface, comprising:

applying an aqueous solution comprising a hydrophilic cationic dispersion polymer to a surface of a substrate with a size press, wherein the hydrophilic cationic dispersion polymer comprises repeating units derived from a first monomer and a second monomer, wherein:

the first monomer comprises a nonionic monomer, the second monomer is at least one hydrophilic cationic monomer selected from the group consisting of: a diallyl-N,N-dimethylammonium halide and a third monomer of the formula I:

I

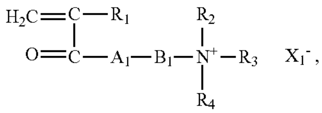

wherein $A_1$ is O or NH; $B_1$ is a $C_2$-$C_4$ alkylene or hydroxypropylene; $R_1$ is H or $CH_3$; $R_2$ and $R_4$ are independently a $C_1$-$C_2$ alkyl; $R_3$ is H or a $C_1$-$C_2$ alkyl; and $X_1$ is an anionic counterion, and the hydrophilic cationic dispersion polymer contains a higher mole % of repeating units derived from hydrophilic cationic monomers than hydrophobic cationic monomers.

15. A paper composition, comprising:

a paper substrate;

a starch;

a sizing agent; and 0.02 weight % to 0.7 weight % of a hydrophilic cationic dispersion polymer based on a dry weight of the paper substrate, wherein the hydrophilic cationic dispersion polymer comprises repeating units derived from a first monomer and a second monomer, wherein:

the first monomer is acrylamide or methacrylamide, the second monomer is at least one hydrophilic cationic monomer selected from the group consisting of: a diallyl-N,N-dimethylammonium halide and a third monomer of the formula I:

I

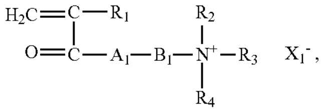

wherein $A_1$ is O or NH; $B_1$ is a $C_2$-$C_4$ alkylene or hydroxypropylene; $R_1$ is H or $CH_3$; $R_2$ and $R_4$ are independently a $C_1$-$C_2$ alkyl; $R_3$ is H or a $C_1$-$C_2$ alkyl; and $X_1$ is an anionic counterion selected from the group consisting of: a halide ion, a sulfate ion, a phosphate ion, a monohydrogen phosphate ion, and a nitrate ion, and the hydrophilic cationic dispersion polymer contains a higher mole % of repeating units derived from hydrophilic cationic monomers than hydrophobic cationic monomers.

16. The composition of claim 1, wherein the hydrophilic cationic dispersion polymer has no repeating units derived from a hydrophobic cationic monomer.

17. The composition of claim 1, wherein the hydrophilic cationic dispersion polymer disposed on the surface of the substrate comprises cationic charge groups capable of interacting with the ink.

18. The method of claim 14, wherein the aqueous solution applied to the surface of the substrate further comprises a starch.

19. The paper composition of claim 15, further comprising an ink.

20. The paper composition of claim 15, wherein the sizing agent comprises a rosin-based product, an alkenyl succinic anhydride, an alkyl ketene dimer, a styrene-maleic anhydride copolymer, a styrene-acrylate copolymer, a polyurethane, or a mixture thereof.

* * * * *